United States Patent [19]
Shusta et al.

[11] Patent Number: 5,840,405
[45] Date of Patent: Nov. 24, 1998

[54] GLITTERING CUBE-CORNER RETROREFLECTIVE SHEETING

[75] Inventors: Jeanine M. Shusta, Mahtomedi; Paul E. Marecki, May Township; Matthew R. Atkinson, Cottage Grove; Cheryl M. Frey, White Bear Lake; Olester Benson, Jr., Woodbury, all of Minn.

[73] Assignee: Minnesota Mining and Manufacturing Company, St. Paul, Minn.

[21] Appl. No.: 640,326

[22] Filed: Apr. 30, 1996

[51] Int. Cl.$^6$ .................................................. G02B 5/124
[52] U.S. Cl. ........................... 428/156; 359/529; 359/530
[58] Field of Search .................................. 359/529, 530; 428/142, 144, 156

[56] References Cited

U.S. PATENT DOCUMENTS

| | | |
|---|---|---|
| Re. 29,396 | 9/1977 | Heenan .................................. 204/281 |
| D. 366,365 | 1/1996 | Hoopman . |
| 3,010,845 | 11/1961 | Schornstheimer ........................ 117/71 |
| 3,450,459 | 6/1969 | Haggerty ................................. 350/103 |
| 3,469,898 | 9/1969 | Altman ................................... 350/103 |
| 3,541,606 | 11/1970 | Heenan et al. .......................... 350/103 |
| 3,632,695 | 1/1972 | Howell ....................................... 264/1 |
| 3,689,346 | 9/1972 | Rowland ................................. 156/245 |
| 3,692,731 | 9/1972 | McAdow ........................... 260/32.8 R |
| 3,697,070 | 10/1972 | McAdow ................................ 106/291 |
| 3,810,804 | 5/1974 | Rowland ................................. 156/245 |
| 3,811,983 | 5/1974 | Rowland ................................. 156/245 |
| 3,830,682 | 8/1974 | Rowland ..................................... 161/2 |
| 3,873,184 | 3/1975 | Heenan ................................... 350/103 |
| 3,923,378 | 12/1975 | Heenan ................................... 350/103 |
| 3,924,929 | 12/1975 | Holmen et al. ......................... 350/103 |
| 3,926,402 | 12/1975 | Heenan ................................... 248/117 |
| 3,935,359 | 1/1976 | Rowland ................................. 428/172 |
| 3,987,229 | 10/1976 | Rairdon et al. ......................... 428/148 |

(List continued on next page.)

FOREIGN PATENT DOCUMENTS

| | | |
|---|---|---|
| 0 269 329 A3 | 6/1988 | European Pat. Off. ........ G02B 5/122 |
| 0 342 958 A2 | 11/1989 | European Pat. Off. ........ G02B 5/122 |
| 3-124754 | 5/1991 | Japan .............................. C08L 33/12 |
| 5-209142 | 8/1993 | Japan . |
| 1516686 | 7/1978 | United Kingdom .............. B44C 1/14 |
| WO 95/11464 | 4/1995 | WIPO ........................... G02B 5/124 |
| WO 95/11471 | 4/1995 | WIPO ........................... G02B 5/124 |
| WO 95/33612 | 12/1995 | WIPO ........................... B29C 33/40 |
| WO 96/10197 | 4/1996 | WIPO ........................... G02B 5/124 |
| WO 96/36480 | 11/1996 | WIPO ........................... B29D 11/00 |

OTHER PUBLICATIONS

3M Information Folder 1.1 "Scotchlite™ Heat–Lamp Vacuum Applicator", May 1992, (75–0299–8918–5 PRF 223).

3M Information Folder 1.2 "Application of Scotchlite™ Reflective Sheeting High Intensity Grade", Aug. 1992, (75–0299–8919–3).

*Primary Examiner*—Christopher Raimund
*Attorney, Agent, or Firm*—Karl G. Hanson

[57] ABSTRACT

A cube-corner retroreflective sheeting 60 includes an array of cube-corner elements 30 that are defined by three sets of intersecting parallel grooves 45, 46, 47. The cube-corner elements 30 are arranged in the array such that the sheeting 60 glitters when exposed to light. The glitter is in the form of many discreet points of light that tend to blink on and off when viewed by the naked eye. The array may be configured such that a dihedral angle α varies between adjacent cube faces 31 of adjacent cube-corner elements 30 in each groove in one of the groove sets 45, 46, or 47 and such that base planes are not parallel to each other when the sheeting 60 is laid flat. Preferably, the dihedral angle α between faces 31 of adjacent cube-corner elements 30 varies in essentially all of the grooves such that the cube-corner elements are randomly tilted throughout the array. The sheeting glitters very well under daytime viewing conditions and also to some extent under nighttime or retroreflective conditions. The glittering effect can enhance the sheeting's conspicuity, and hence highlight a person's presence to give them improved safety and security.

34 Claims, 6 Drawing Sheets

U.S. PATENT DOCUMENTS

| | | | |
|---|---|---|---|
| 3,988,494 | 10/1976 | McAdow | 428/328 |
| 3,992,080 | 11/1976 | Rowland | 350/103 |
| 4,025,159 | 5/1977 | McGrath | 350/105 |
| 4,066,331 | 1/1978 | Lindner | 350/103 |
| 4,202,600 | 5/1980 | Burke et al. | 350/103 |
| 4,243,618 | 1/1981 | Van Arnam | 264/1 |
| 4,303,305 | 12/1981 | Jones | 350/103 |
| 4,332,847 | 6/1982 | Rowland | 428/156 |
| 4,349,598 | 9/1982 | White | 428/161 |
| 4,486,363 | 12/1984 | Pricone et al. | 264/1.4 |
| 4,588,258 | 5/1986 | Hoopman | 350/103 |
| 4,601,861 | 7/1986 | Pricone et al. | 264/1.6 |
| 4,668,558 | 5/1987 | Barber | 428/156 |
| 4,712,868 | 12/1987 | Tung et al. | 350/105 |
| 4,775,219 | 10/1988 | Appeldorn et al. | 350/103 |
| 4,801,193 | 1/1989 | Martin | 350/103 |
| 4,895,428 | 1/1990 | Nelson et al. | 350/103 |
| 5,084,782 | 1/1992 | Taylor | 359/515 |
| 5,138,488 | 8/1992 | Szczech | 359/529 |
| 5,152,917 | 10/1992 | Pieper et al. | 51/295 |
| 5,202,180 | 4/1993 | Watts | 428/324 |
| 5,213,872 | 5/1993 | Pricone et al. | 428/195 |
| 5,272,562 | 12/1993 | Coderre | 359/529 |
| 5,276,075 | 1/1994 | Santini | 524/40 |
| 5,362,374 | 11/1994 | Chang | 205/164 |
| 5,387,458 | 2/1995 | Pavelka et al. | 428/141 |
| 5,450,235 | 9/1995 | Smith et al. | 359/529 |
| 5,454,844 | 10/1995 | Hibbard et al. | 51/295 |
| 5,470,058 | 11/1995 | Sullivan et al. | 273/65 B |
| 5,485,311 | 1/1996 | McAllister | 359/530 |
| 5,592,330 | 1/1997 | Bernard | 359/529 |

GLITTERING CUBE-CORNER RETROREFLECTIVE SHEETING

TECHNICAL FIELD

This invention pertains to a cube-corner retroreflective sheeting that glitters when exposed to light.

BACKGROUND

Retroreflective sheeting is characterized by its ability to reflect substantial quantities of incident light back towards the light source. This unique ability has promoted widespread use of retroreflective sheetings on signs, barricades, traffic cones, clothing, and other items that need to be visible at nighttime. Retroreflective sheeting improves the conspicuity of the articles onto which the sheeting is placed, particularly at nighttime.

A very common retroreflective sheeting uses an array of cube-corner elements to retroreflect light. FIGS. 1 and 2 illustrate an example of such a retroreflective sheeting, noted generally by numeral 10. The array of cube-corner elements 12 project from a first or rear side of a body portion 14 that includes a body layer 18 (also referred to in the art as an overlay) and may also include a land layer 16. Light enters the cube-corner sheeting 10 through the front surface 21; it then passes through the body portion 14 and strikes the planar faces 22 of the cube-corner elements 12 to return in the direction from which it came as shown by arrow 23.

FIG. 2 shows the back side of the cube-corner elements 12, where each cube-corner element 12 is in the shape of a trihedral prism that has three exposed planar faces 22. The cube-corner elements 12 in known arrays are typically defined by three sets of parallel v-shaped grooves 25, 26, and 27. Adjacent planar faces 22 on adjacent cube-corner elements 12 in each groove form an external dihedral angle (a dihedral angle is the angle formed by two intersecting planes). This external dihedral angle is constant along each groove in the array. This has been the case for a variety of previously produced cube-corner arrays (including those disclosed in the patents cited in the next paragraph).

The planar faces 22 that define each individual cube-corner element 12 generally are substantially perpendicular to one another, as in the corner of a room. The internal dihedral angle—that is, the angle between the faces 22 on each individual cube-corner element in the array—typically is 90°. This internal angle, however, can deviate slightly from 90° as is known in the art; see U.S. Pat. No. 4,775,219 to Appeldorn et al. Although the apex 24 of each cube-corner element 12 may be vertically aligned with the center of its base (see, for example, U.S. Pat. No. 3,684,348), the apex also may be offset or canted from the center as disclosed in U.S. Pat. No. 4,588,258 to Hoopman. Other cube-corner configurations are disclosed in U.S. Pat. Nos. 5,138,488, 4,066,331, 3,923,378, 3,541,606, and Re 29,396.

While known cube-corner retroreflective sheetings come in a variety of configurations that provide very effective nighttime retroreflectivity, and hence very effective nighttime conspicuity, known retroreflective sheetings generally have had somewhat limited conspicuity under daytime lighting conditions. This is because under daytime conditions the retroreflected light is not easily distinguishable from the surrounding ambient light. Thus, other measures have been taken to enhance daytime conspicuity, including adding fluorescent dyes to the retroreflective sheeting,—see U.S. Pat. Nos. 5,387,458 and 3,830,682. Or, as disclosed in U.S. Pat. No. 5,272,562 to Coderre, white opaque pigment particles have been dispersed in the front of the cube-corner elements. Although the presently known techniques are very effective for improving a retroreflective sheeting's daytime conspicuity, they possess the drawback of requiring the addition of another ingredient namely dye or pigment, to achieve the enhanced conspicuity.

SUMMARY OF THE INVENTION

The present invention provides a new and very different approach to improving a retroreflective sheeting's daytime conspicuity. Rather than use a fluorescent dye or bright pigments, as has been done in the prior art, the present invention enhances conspicuity by furnishing the cube-corner sheeting with a glittering effect that can attract an onlooker's attention. In brief, the invention is a retroreflective sheeting that includes an array of cube-corner elements that are arranged in the array to make the sheeting glitter when light is incident thereon.

The terms "glitter", "glitters", or "glittering" are used herein to mean a multiplicity of discreet regions of light that appear as distinct points of light, each of which may be noticed by the unaided eye of an ordinary observer when light is incident on the sheeting, but which points of light disappear or become unnoticeable to the eye of the same observer when either the angle of the incident light source to the sheeting, the angle of observation, the sheeting's orientation, or a combination thereof are changed. Some points of light may appear, for example, violet in color, while others may display orange, green, yellow or any of the other colors of the visible spectrum.

In some embodiments, the glittering effect may be seen from both the front and back sides of the sheeting when light strikes either the front or the back. The glittering effect is particularly noticeable when viewed under sunlight. The glittering effect may be seen from the front side at observation angles of −90 degrees to +90 degrees from an incidence angle extending normal (zero degrees) to a flat sample. Sheetings of the invention also can glitter when viewed from the backside −90 degrees to +90 degrees from a normal or zero degree incidence angle. Even if the incidence angle is offset from a line normal to the sheeting, the glittering effect may also be noticeable at all viewing angles. As a sample is rotated 360 degrees, the glitter may be seen continuously. During the rotation, some points of light disappear but others appear. This provides a broad range of angles over which continual "blinking" on and off of light from different cube-corners occurs, resulting in the phenomenon of glitter. Sheetings of the invention may be capable of glittering under essentially all possible illumination and viewing angles, in all combinations.

The glitter enhances the sheeting's daytime conspicuity, and to some extent may also improve its nighttime conspicuity. The glitter also adds aesthetic appeal to the retroreflective sheeting and may be useful for producing graphic images such as product identifiers. These advantages and others are more fully described below in the detailed description of the invention.

DETAILED DESCRIPTION OF THE PREFERRED EMBODIMENTS

Figure 1:
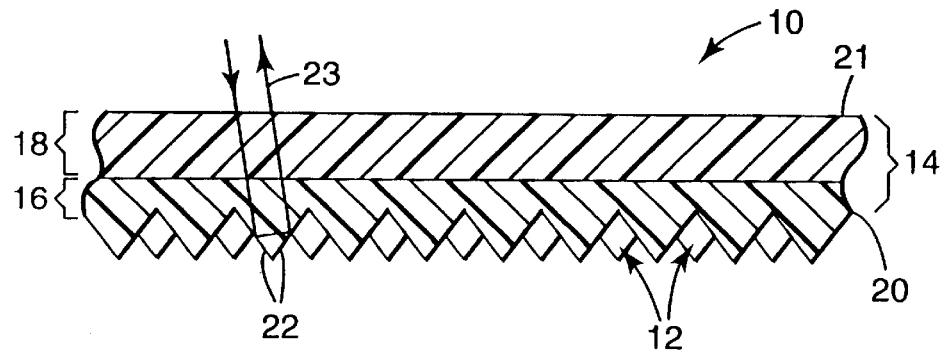
FIG. 1 is a sectional view of a prior art retroreflective sheeting 10.
Figure 2:
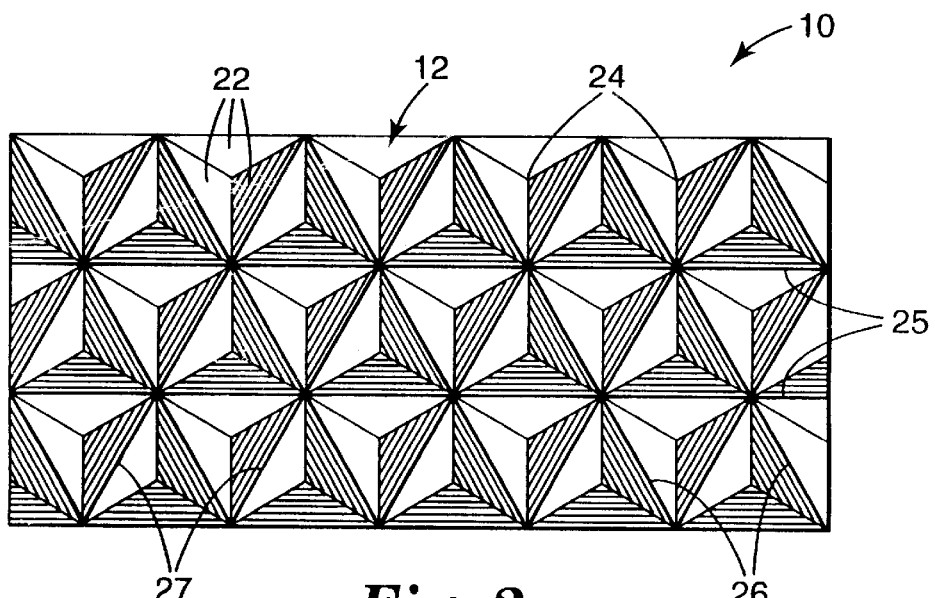
FIG. 2 is a bottom view of the prior art retroreflective sheeting 10 illustrated in FIG. 1.

In the practice of the present invention, a retroreflective sheeting is provided that can exhibit a glittering effect under daytime lighting conditions as well as under nighttime or retroreflective lighting conditions (although not to as noticeable an extent). The glittering effect can provide the sheeting with good daytime brightness or lightness as measured by a standardized test, ASTME 1349-90, where lightness is expressed by the Luminance Factor Y (LFY). Clear, colorless sheetings of the invention may demonstrate a LFY value of 38 or greater, and even 55 or greater. Of course, LFY values may differ depending on the color of the glittering sheeting. Further, the LFY value may be higher depending on the degree of texture or pattern present in the glittering sheeting. The measurement geometry imposed by ASTM E 1349-90 (0/45° or 45/0°) excludes detection of substantial portions of the lightness due to glittering because the glittering sheetings reflect large amounts of light at angles that are not detected. The sheeting may display at least about 10, and preferably at least about 50, points of light per square centimeter ($cm^2$) when the sheeting is viewed under direct sunlight. Typically, there are less than about 250 points of light per $cm^2$ when viewed under direct sunlight. The glitter is achieved not through incorporating metal particles or flakes in a sheeting or a coating as is commonly done in the glittering art—see, e.g., U.S. Pat. Nos. 5,470,058, 5,362,374, 5,276,075, 5,202,180, 3,988,494, 3,987,229, 3,697,070, 3,692,731, and 3,010,845—but instead is achieved through an entirely different and new approach, namely, by orienting cube-corner elements in a new geometric arrangement.

In a preferred embodiment of this new geometric arrangement, at least one set of parallel grooves in an array of cube-corner elements has faces of adjacent cube-corner elements arranged such that the external dihedral angle formed between the faces varies along at least one groove in the set.

In another preferred embodiment, the external dihedral angle between faces of adjacent cubes varies in all grooves to such an extent that the cubes are randomly tilted across the array. What is meant by "randomly tilted" is that the cubes in the sheeting are tilted in a nonrepeating pattern relative to a reference plane that can be the front surface of the retroreflective sheeting when laid flat. A cube is considered "tilted" when its optical axis is not perpendicular to the reference plane. The "optical axis" is customarily understood as being the internal line that extends from the cube apex and forms equal angles with each cube edge that extends from the apex. In other words, the optical axis is the line defined by the intersection of three planes that each bisect one of the three internal dihedral angles formed by the cube-corner element's three planar faces. All previously known retroreflective sheetings have had the cube-corner elements arranged in a predetermined repeating pattern throughout the array. If a known cube-corner sheeting is thought of as an army that marches in cadence in strict formation, a randomly-oriented sheeting would be a drunken army where each cube-corner element represents individual soldiers that stagger and possibly bump into each other as they march.

Figure 3:
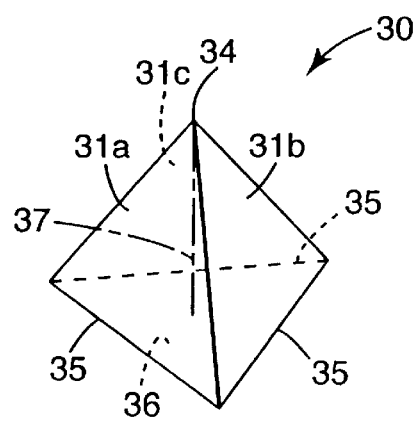
FIG. 3 is an isometric view of a cube-corner element 30 that may be used in a retroreflective sheeting of the invention.

FIG. 3 illustrates a cube-corner element 30 that is useful in retroreflective sheetings of the invention (60, FIG. 4) as well as in sheetings of the prior art (10, FIG. 1). As shown, a cube-corner element 30 is a body that has three mutually perpendicular faces 31a, 31b, and 31c that meet at the element's apex 34. The cube-corner element's base edges 35 are generally linear and generally lie in a single plane that defines the base plane 36 of the element 30. Cube-corner element 30 also has a central or optical axis 37, which is the tri-sector of the internal angles defined by lateral faces 31a, 31b, and 31c. The optical axis may be disposed perpendicular to the base plane 36, or it may be canted as described in U.S. Pat. No. 4,588,258 to Hoopman and U.S. Pat. No. 5,138,488 to Szczech. Retroreflection can occur when light incident on base plane 36 is internally reflected from a first lateral face 31a to a second face 31b, and then to a third face 31c, and then back through base 36 toward the light source. In addition to defining a single cube-corner by a three-sided pyramid having a triangular base plane such as disclosed in the Hoopman patent, the cube-corner elements may be defined by a rectangular base, two rectangular sides, and two triangular sides such that each structure has two cube-corners each such as disclosed in U.S. Pat. No. 4,938,563 to Nelson et al., or may be of essentially any other cube-corner shape and may be defined by two perpendicular intersecting sets of parallel grooves (see also U.S. Pat. No. 4,895,428 to Nelson et al.).

Figure 4:
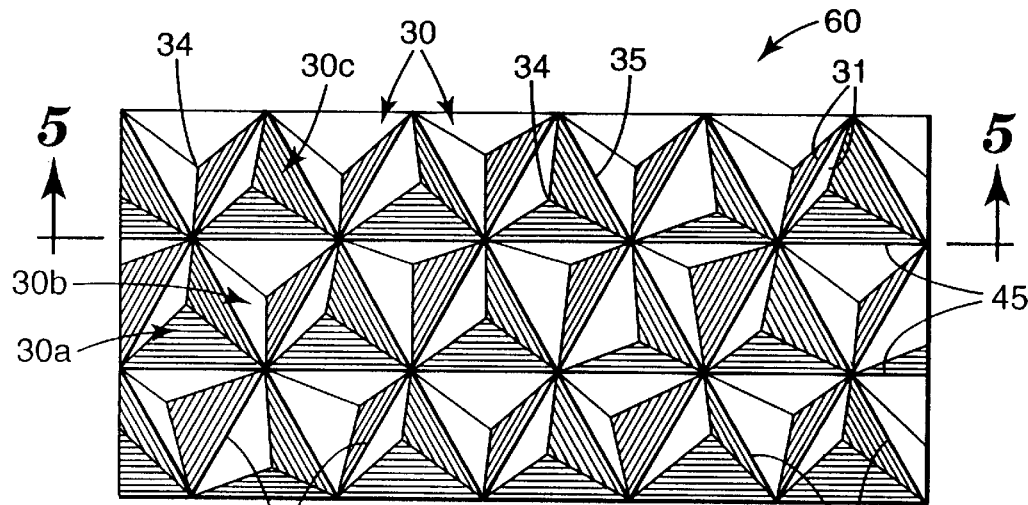
FIG. 4 is a bottom view of a retroreflective sheeting 60 in accordance with the present invention.

FIG. 4 shows the structured surface or backside of a cube-corner sheeting 60, that includes a unitary or single layer of an array of cube-corner elements 30, like the element depicted in FIG. 3. Each cube-corner element 30 meets, but is not necessarily connected to, an adjacent cube-corner element at a base edge 35. The array includes three sets of generally parallel grooves 45, 46, and 47. The external dihedral angles (α, FIG. 5) between faces 31 of adjacent cube-corner elements 30 vary along the grooves 45–47 in the array. The cube-corner elements in the array are randomly tilted, and because of this, the apex 34 of one cube, such as cube 30a may be relatively close to another apex such as cube 30b, but cube 30b's apex may then be farther away from another adjacent apex such as the apex of cube 30c.

Figure 5:
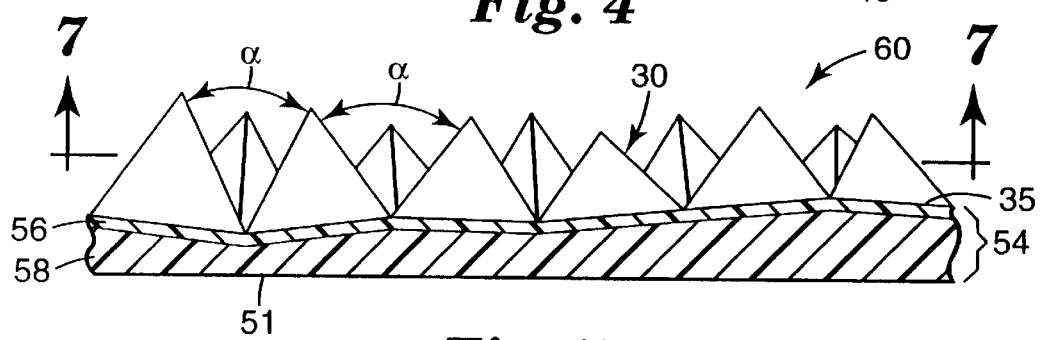
FIG. 5 is a sectional view of retroreflective sheeting 60 taken along lines 5—5 of FIG. 4.

FIG. 5 also illustrates the position of one cube apex relative to another and additionally shows how the cube's base edges 35 do not lie in the same common plane. The base edge 35 of one cube may be disposed closer to or farther away from the front surface 51 of retroreflective sheeting 60 than the base edges of other adjacent cube-corner elements. And in a single cube, points on one of its base edges 35 may be located closer to or farther away from front surface 51 than points on another base edge 35 in the same cube. Base edges 35 define the lowest point of grooves 45–47—and because edges 35 do not all lie in the same plane, the grooves have a varying pitch along their length. If the cube-corner sheeting possesses a land layer 56, it too is also not uniformly spaced from the front surface 51. When the cube-corner elements are tilted, the base planes 36 (FIG. 3) of each cube-corner element are not parallel, and they do not reside in the same plane. Many of the base planes also do not reside in the same plane as the front surface 51—that is, the base planes are not parallel to the sheeting's front surface 51 when the sheeting is laid flat on a surface.

Cube-corner element sheetings have been produced where some of the element's base planes do not reside parallel to the sheeting's front surface when the sheeting is laid flat. Such sheetings, however, have had the array of cube-corner elements disturbed or rearranged in certain areas by sealing a film to the backside of the array (such as discussed below with reference to FIGS. 8 and 9) or by creating bubbles (U.S. Pat. No. 5,485,311 to McAllister). The seal line and the bubbles upset the sheeting's front surface and the orientation of the cube-corner elements in the array. For purposes of this invention, therefore, a sheeting is not considered to be "laid flat" in those areas where the sheeting is disturbed by seal lines (item 64 FIGS. 8 and 9) or bubbles (24 of the '311 patent). The base planes 36 (FIG. 3) in sheetings of the invention may be offset at angles of zero to 90 degrees from the reference plane or front surface when the sheeting is laid flat. The base planes that are tilted relative to the front surface of the sheeting when laid flat typically form an angle of about 1 to 10 degrees from the front surface.

FIG. 5 also shows the external dihedral angle, α, that defines the angle between faces 31 (FIG. 4) of adjacent cube-corner elements 30. Angle α may vary along some or all grooves in a single generally parallel groove set, it may vary along some or all grooves in two generally parallel groove sets, or it may vary along some or all grooves in all three generally parallel groove sets in the array. In an array of randomly tilted cube-corner elements, angle α varies randomly amongst adjacent faces of adjacent cube-corner elements throughout essentially the whole array that is intended to glitter. Angle α may vary from zero degrees to 180 degrees, but on average ranges from about 35 to 115 degrees for dihedral angles between faces of adjacent cubes.

Figure 6:
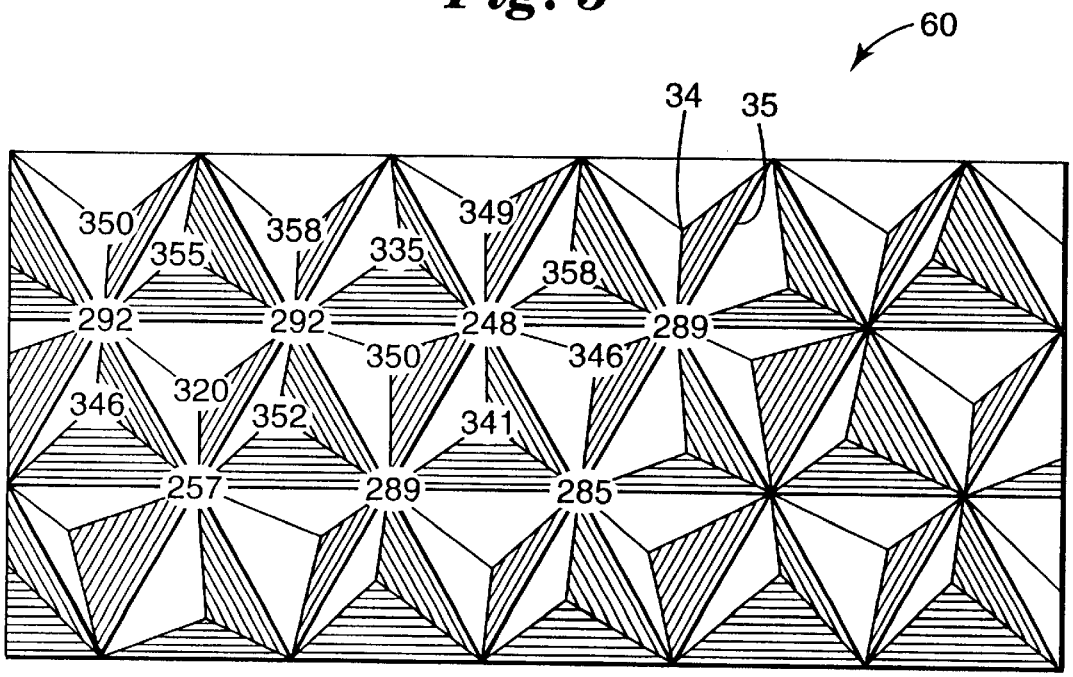
FIG. 6 is a bottom view of retroreflective sheeting 60, illustrating apex and groove intersection heights from a reference plane.

FIG. 6 illustrates some typical distances of apexes 34 and groove intersections from the sheeting's front surface 51 (FIG. 5). The cube-corner element in the upper left hand corner of the array has an apex that is spaced 350 micrometers from the front surface 51. The fourth cube over from the upper left-hand corner, however, has an apex height of 335 micrometers. There is thus a difference in apex height of 15 micrometers between cubes that are fairly close to one another. The cube-corner elements typically have an average height of about 20 to 500 micrometers, more typically of about 60 to 200 micrometers. For cube-corner elements that are about 60 to 200 micrometers high, the variation in height between adjacent apexes typically is about 0 to 60 micrometers and typically is about 1 to 40 micrometers on average, more typically 5 to 25 micrometers on average, but preferably does not exceed more than 50 micrometers on average. The variation in height between adjacent groove intersections for such cubes typically is about 0 to 100 micrometers and typically is about 3 to 50 micrometers on average, but preferably does not exceed more than 60 micrometers on average. For purposes of this description, the "base valleys" are defined as the intersecting points of the v-shaped grooves in the cube-corner array.

The body layer 58 (FIG. 5) in body portion 54 (FIG. 5) typically has an average thickness of approximately 20 to 1200 micrometers, and preferably is about 50 to 400 micrometers. The optional land layer 56 (FIG. 5) preferably is kept to a minimal thickness of 0 to less than about 100 micrometers.

In the cube-corner element array shown in FIGS. 4–6, the groove sets 45, 46, and 47 are illustrated as being parallel. It is within the scope of this invention, however, for grooves of the same set to be other than parallel. Some grooves may be parallel and others may not. Some grooves may run parallel to adjacent grooves of the same groove set in some regions of the sheeting but may also cross paths or overlap those same grooves. In such instances, the cube-corner elements may pile up on each other. As long as there are two or more grooves that extend in the same general direction roughly parallel to each other, those grooves are viewed as being "generally parallel" regardless of whether the grooves at some other point cross paths, overlap, converge, or diverge.

Figure 7:
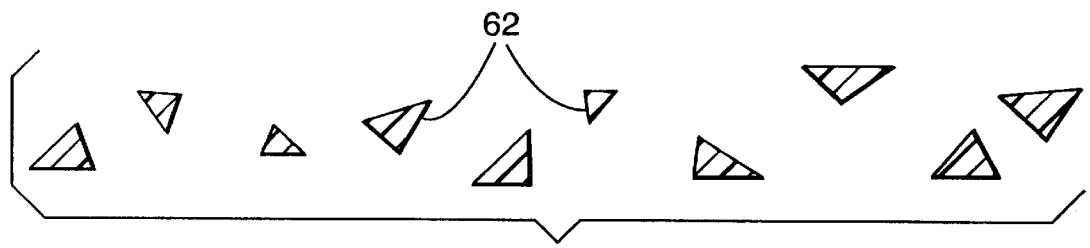
FIG. 7 is a sectional view of retroreflective sheeting 60 taken along lines 7—7 of FIG. 5.

FIG. 7 shows cube-corner elements intersected by a plane that is parallel to the retroreflective sheeting's front surface 51 (FIG. 5). As illustrated, the plane intersects the cube-corner elements to produce triangles 62 of different cross-sectional areas. Some cubes may be tilted to such an extent that the intersecting plane only passes through a tip of the cube, resulting in a small triangular cross-section—whereas, a cube that stands upright may be intersected such that the triangle resulting from the cross-section is relatively large. Thus, even though the cube-corner elements in the array may be of similar size, they can produce triangles of random sizes when intersected as described because of the manner in which the cubes are tilted with respect to a reference plane.

Figure 8:
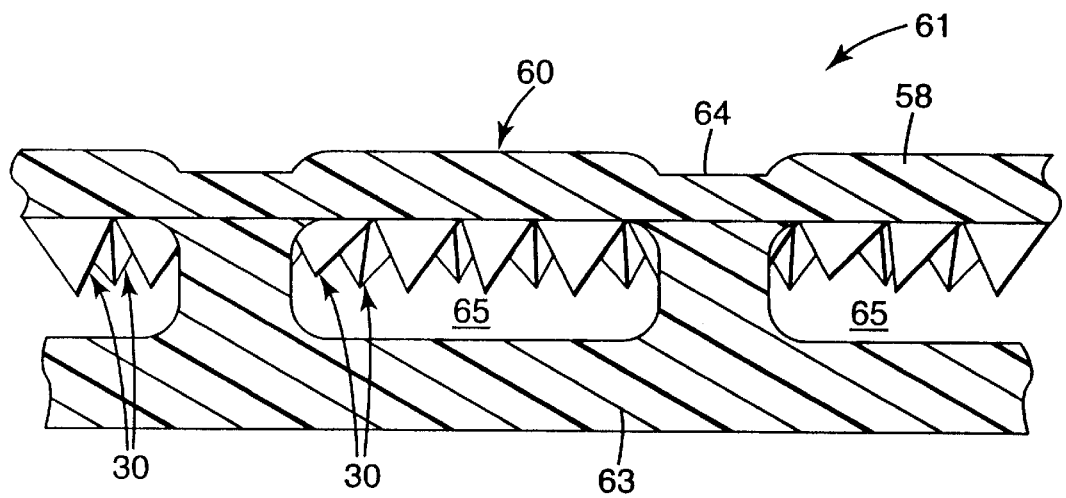
FIG. 8 is a sectional view of a retroreflective product 61 in accordance with the present invention having a seal film 63 secured to the backside of the retroreflective sheeting 60.

FIG. 8 shows a retroreflective product 61 that has a seal film 63 disposed over the backside of cube-corner elements 30. The seal film is bonded to the body layer 58 of the sheeting 60 through the layer of cube-corner elements 30 by a plurality of seal lines 64. The bonding pattern produces a plurality of hermetically-sealed chambers 65 that maintain a cube/air interface and prevent moisture and dirt from contacting the backside of the cube-corner elements. Maintenance of the cube/air interface is necessary to prevent loss of retroreflectivity.

The seal film may be bonded to the retroreflective sheeting using known techniques; see for example, U.S. Pat. No.

4,025,159. Sealing technique examples include radio frequency welding, thermal fusion, ultrasonic welding, and adhesive bonding. When applying a seal film to the backside of a retroreflective sheeting, considerable attention must be paid to the composition and physical properties of the seal film. The seal film must be able to bond securely to the sheeting, and it should not contain components that could adversely affect retroreflectivity or the appearance of the retroreflected product. For example, the seal film should not contain components that could leach out (e.g., dyes) to contact the backside of the cube-corner elements. The seal film typically comprises a thermoplastic material because such materials lend themselves to fusing through relatively simple and commonly available thermotechniques.

Radio frequency ("RF") welding accomplishes sealing using radio frequency energy that heats the polymer. When a radio frequency field is applied to a thermoplastic polymer with polar groups, the tendency of the polar groups to switch orientation with the radio frequency determines the degree to which RF energy is absorbed and converted to kinetic motion. The kinetic energy is conducted as heat to the entire polymer molecule, and if enough RF energy is applied, the polymer will heat sufficiently to soften. Detailed discussions of RF welding may be found in U.S. patent application Ser. No. 08/472,444 filed Jun. 7, 1995 and in the article, "RF Welding and PVC and Other Thermoplastic Compounds" by J. Leighton, T. Brantley, and E. Szabo in ANTEC 1992, pp. 724–728.

A seal film also may be secured to the retroreflective sheeting through thermal fusion which involves pressing thermoplastic materials together between heated dies or platen surfaces. The contact forms the desired sealing pattern. While the heated die or platen surfaces press the thermoplastic materials together, the polymer areas that are in contact melt and the polymer molecules flow together while hot and form a fusion bond on cooling.

An alternative to radio frequency welding and thermal fusion methods is ultrasonic welding. Ultrasonic welding is a technique where two materials are bonded together between a horn and an anvil. The horn vibrates at ultrasonic frequencies, commonly in the range of about 20,000–40,000 Hz. Pressure is applied to the cube-corner sheeting and the seal film, and the vibrational energy is dissipated as heat. The frictional heating softens the polymer molecules to create a fusion bond between the sheeting and the film. The horn and anvil are positioned to localize heat in the area where the bond is intended. Heat localization assures softening and melting of the bonding materials in very small regions which, in turn, helps minimize damage to the surrounding material from heat exposure.

Amorphous materials that have broad softening ranges may be ultrasonically bonded better than crystalline materials because the former tend to dissipate frictional heat more effectively. Examples of materials that form good-to-excellent ultrasonically welded bonds include nylon, polycarbonate, plasticized poly(vinyl chloride) (PVC), polystyrene, thermoplastic polyester, polypropylene, and acrylics. Polyethylene and fluoropolymers are examples of materials that form fair to poor ultrasonic welds.

Ultrasonic welding is sensitive to other factors including plastic variation from batch to batch, molding parameter changes, moisture absorption, mold release, lubricants, fillers, regrind, flame retardants, pigments, and plasticizers. Reference is made to the following articles: "Heating and Bonding Mechanisms in Ultrasonic Welding of Thermoplastics" by M. N. Tolunay, P. R. Dawson, and K. K. Wang in Polymer Engineering and Science, September 1983, Vol. 23, No. 13, p. 726; "Update on Welding: More Science, Less Art" by M. Rogers in Plastics Technology, June 1981, pp. 56–62; "Ultrasonic Welding" in Engineering Materials and Design, April 1981, pp. 31–34.

Adhesive bonding can be achieved by coating an adhesive onto a cube-corner sheeting's backside and then bringing the seal film into contact with the adhesive coated sheeting. Alternatively, the seal film may be coated with an adhesive before bonding to the cube-corner sheeting. Adhesive coating may be done in essentially any desired pattern such that the areas not coated with adhesive form retroreflective cells 65 as shown in FIG. 8. The adhesive also may be coated over a reflective coating that is disposed on the back side of the cube-corner sheeting. See U.S. Pat. No. 5,376,431 to Rowland for a description of adhesive bonding.

When the glittering sheeting is sealed piecewise, the radio frequency technique is preferred because the process is generally practiced as a "step and repeat process" that is compatible with sealing individual items. When the glittering sheeting is sealed continuously from roll goods, ultrasonic welding is preferred because this process can be easily practiced as a continuous method.

Figure 9:
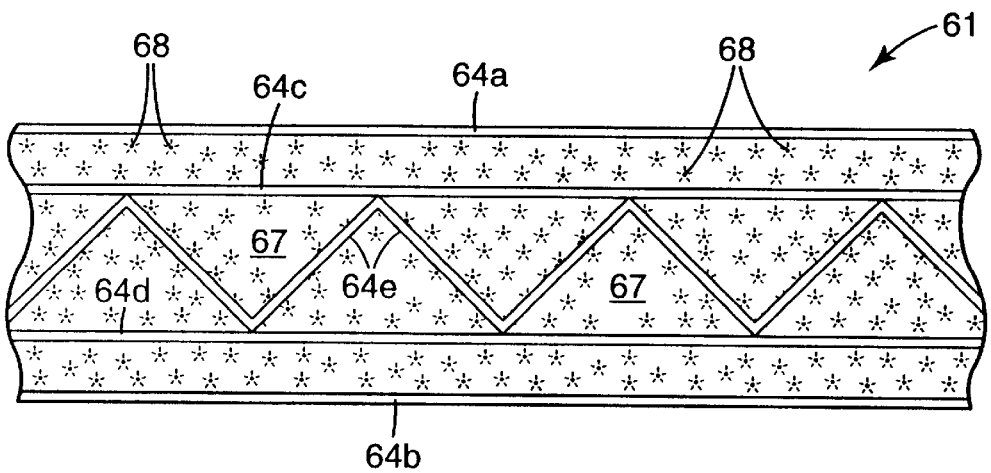
FIG. 9 is a front view of retroreflective product 61 illustrating a seal pattern that may be used to produce hermetically-sealed chambers 65 (FIG. 8) behind the cube-corner elements 30 (FIG. 8).

FIG. 9 illustrates an example of a seal pattern that may be used to produce a retroreflective product 61. As shown, retroreflective product 61 is in the form of a strip that has a length dimension that substantially exceeds the width dimension. Bond lines 64*a* and 64*b* are disposed along the lengthwise edges of sheeting 61 to prevent delamination of seal film 63 (FIG. 8). Disposed laterally inward from bond lines 64*a* and 64*b* are bond lines 64*c* and 64*d* that run parallel to bond lines 64*a* and 64*b*. Extending between bond lines 64*c* and 64*d* are bond lines 64*e* that are not parallel to the sheeting's lengthwise edges. Bond lines 64*c*–64*e* define a number of completely enclosed geometric patterns 67 that define the hermetically sealed chambers 65 shown in FIG. 8. The surface area of the geometric patterns 67 may vary depending, for example, on the width of product 61 but typically are about 0.5 to 30 cm$^2$, more typically about 1 to 20 cm$^2$.

Retroreflective product 61 typically comes in sizes ranging from one-half inch (1.27 cm) to three inches (7.6 cm) wide. Typical widths are one-half inch (1.27 cm) wide, three-quarters of an inch (1.9 cm) wide, one inch (2.54 cm) wide, one and three eighths inches (3.5 cm) wide, one and one-half inches (3.81 cm) wide, two inches (5.08 cm) wide, or two and three fourths inches (7.0 cm) wide. Lengths of product 61 may typically be as large as about 100 meters, with the product being supplied in roll form.

Panels of retroreflective products that have seal films disposed thereon also may be produced. Panel sizes may be, for example, 200 cm$^2$ to 1000 cm$^2$. The whole area within the panel, or certain selected areas, within it, may glitter.

In a typical retroreflective product 61, essentially the whole area within the enclosed geometric pattern displays the glittering effect, where each point of light is referenced by number 68. If desired, some geometric patterns may display the glittering effect while others do not. For example, it may be possible to have the triangular patterns 67 alternate between glittering and non-glittering. It may also be possible to provide glittering portions or images within each geometric pattern as described below in detail. Although the glittering effect typically would not be noticeable, or significantly noticeable, within each seal line because the cube-corner elements typically become engulfed in the seal line, the glittering effect is very noticeable "substantially beyond" the seal line(s). That is, the glittering effect may be noticed at a distance beyond where heat and/or pressure from the sealing operation would affect the cube-corner elements in the array. Typically, a sealing operation that used heat and/or pressure would not affect the cube-corner elements at a distance greater than two millimeters (mm), and more typically at 5 mm or more from a seal line. Sheetings of the invention are capable of glittering across an array of cube-corner elements regardless of whether a seal film is bonded to the backside of the cube-corner element array.

In lieu of (or possibly in addition to) a seal film 63, a reflective coating such as a specularly reflective metallic coating can be placed on the backside of the cube-corner elements to promote retroreflection; see, for example, U.S. Pat. No. 5,272,562 to Coderre and U.S. Pat. No. 5,376,431 to Rowland and in WO 93/14422. The metallic coating may be applied by known techniques such as vapor depositing or chemically depositing a metal such as aluminum, copper, silver, or nickel. Instead of a metallic coating, a layer of dielectric material may be applied to the back side of the cube-corner elements, see, for example, U.S. Pat. Nos. 4,763,985 and 3,700,305 to Bingham.

Although placing a metal coating on the backside of the cube-corner elements can reduce the sheeting's daytime lightness, the glittering effect can counter this reduction. Metal coated glittering samples may demonstrate LFY lightness values of at least 10, and even greater than 25.

Figure 10:
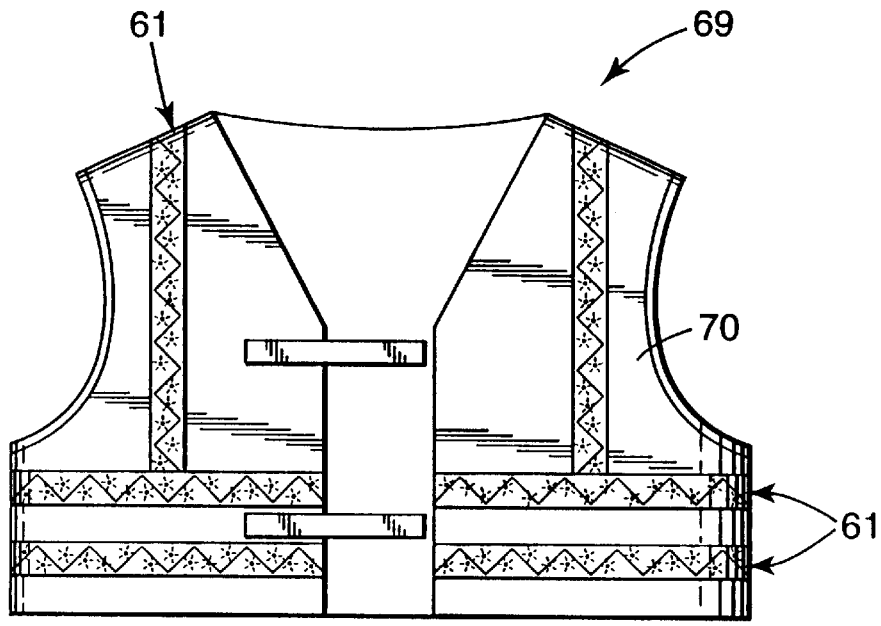
FIG. 10 illustrates a safety vest 69 that has glittering retroreflective products 61 of the present invention placed on its outer surface 70.

FIG. 10 illustrates an example of an article of clothing onto which a retroreflective product 61 of the invention may be disposed. The article of clothing may be a safety vest 69 that has glittering retroreflective products 61 secured to its outer surface 70. Other vests that may display retroreflective products of the invention are shown, for example, in U.S. Pat. No. 5,478,628, Des. 281,028, and Des. 277,808. Examples of other articles of clothing onto which the retroreflective products of the invention may be applied include shirts, sweaters, jackets, coats, pants, shoes, socks, gloves, belts, hats, suits, one-piece body garments, bags, backpacks, helmets, etc. The term "article of clothing" thus, as used here, means any article sized and configured to be worn or carried by a person and is capable of displaying a retroreflective article on its outer surface.

The inventive glittering cube-corner sheetings can be made in accordance with two techniques. In the first technique, a glittering cube-corner retroreflective sheeting is made by providing a first cube-corner sheeting that has the cubes arranged in a conventional configuration, namely, a non-random orientation, and exposing this sheeting to heat, pressure, or a combination of both. In the second technique, a mold is produced that is a negative of a cube-corner sheeting of the invention. This mold may then be used to provide glittering retroreflective sheetings. A method of making glittering retroreflective sheetings is described in U.S. Pat. No. 5,770,124.

When using the first technique, a retroreflective sheeting is first produced or otherwise obtained which has the cube-corner elements arranged in an ordered configuration. There are many patents that disclose retroreflective sheetings that have ordered arrays of cube-corner elements: see, for example, U.S. Pat. Nos. 5,236,751, 5,189,553, 5,175,030, 5,138,488, 5,117,304, 4,938,563, 4,775,219, 4,668,558, 4,601,861, 4,588,258, 4,576,850, 4,555,161, 4,332,847, 4,202,600, 3,992,080, 3,935,359, 3,924,929, 3,811,983, 3,810,804, 3,689,346, 3,684,348, and 3,450,459. Ordered cube-corner arrays may be produced according to a number of known methods, including those disclosed in the patents cited in the previous sentence. Other examples are disclosed in U.S. Pat. Nos. 5,450,235, 4,601,861, 4,486,363, 4,322, 847, 4,243,618, 3,811,983, 3,689,346, and 5,691,846.

Preferably, the cube-corner elements that are used in the non-randomly oriented starting sheeting are made from materials that are harder than the materials used in the body portion, particularly the body layer. A selection of such materials allows the cube-corner elements to tilt, without significantly distorting each cube's shape, when the sheeting is exposed to certain amounts of heat and/or pressure. The heat, pressure, or both that are applied to the sheeting should be sufficient to alter the array significantly from its ordered configuration. With a very soft body layer, pressure alone, that is, pressure above atmospheric, or heat alone, namely, heat greater than the softening temperature may be sufficient to change the array from an ordered configuration.

A cube-corner retroreflective sheeting that has hard cubes and a softer body layer is disclosed in U.S. Pat. No. 5,450,235 to Smith et al. As described in this patent, the body portion includes a body layer that contains a light transmissible polymeric material that has an elastic modulus less than $7 \times 10^8$ pascals. The cube-corner elements, on the other hand, contain a light transmissible polymeric material that has an elastic modulus greater than $16 \times 10^8$ pascals. U.S. Pat. No. 5,691,846 also discloses a number of materials that may be used to produce cube-corner sheetings in accordance with this invention. This patent application specifies that the elastic modulus of the cube-corner elements is at least $1 \times 10^7$ Pascals greater than the elastic modulus of the body layer and that its cube-corner elements may be made from materials that have an elastic modulus greater than about $2.0 \times 10^8$ pascals (preferably greater than about $25 \times 10^8$ pascals) and that the body layer or overlay may be made from materials that preferably have an elastic modulus less than about $13 \times 10^8$ pascals. When a cube-corner sheeting made from materials of those designated elastic modulus values is exposed to certain amounts of heat and pressure, the body layer softens, allowing the cubes to move in response to the pressure and thus become tilted relative to the sheeting's front surface. When using such a construction, the land layer (56, FIG. 7) ideally is kept to a minimal thickness (for example, less than ten percent of the cube-corner element height), and preferably zero thickness, so that the cubes can easily tilt along their base edges. For this same reason, it is also preferred in this invention that the cube-corner elements are fractured along their base edges as disclosed in U.S. Pat. No. 5,614,286 and in U.S. Pat. No. 5,691,846.

Elastic modulus may be determined according to standardized test ASTM D 882-75b using Static Weighing Method A with a five inch initial grip separation, a one inch sample width, and an inch per minute rate of grip separator. Under some circumstances, the polymer may be so hard and brittle that it is difficult to use this test to ascertain the modulus value precisely (although it would be readily known that it is greater than a certain value). If the ASTM method is not entirely suitable, another test, known as the "Nanoindentation Technique" may be employed. This test may be carried out using a microindentation device such as a UMIS 2000 available from CSIRO Division of Applied Physics Institute of Industrial Technologies of Lindfield, New South Wales, Australia. Using this kind of device, penetration depth of a Berkovich pyramidal diamond indenter having a 65 degree included cone angle is measured as a function of the applied force up to the maximum load. After the maximum load has been applied, the material is allowed to relax in an elastic manner against the indenter. It is usually assumed that the gradient of the upper portion of the unloading data is found to be linearly proportional to force. Sneddon's analysis provides a relationship between the indenting force and plastic and elastic components of the penetration depth (Sneddon I. N. *Int. J. Eng. Sci.* 3, pp. 47–57 (1965)). From an examination of Sneddon's equation, the elastic modulus may be recovered in the form $E/(1-v^2)$. The calculation uses the equation:

$$E/(1-v^2)=(dF/dh_e)F_{max}1/(3.3h_{pmax}\tan(\theta))$$

where:

v is Poisson's ratio of the sample being tested;

$(dF/dh_e)$ is the gradient of the upper part of the unloading curve;

$F_{max}$ is the maximum applied force;

$h_{pmax}$ is the maximum plastic penetration depth;

$\theta$ is the half-included cone angle of the Berkovich pyramidal indenter; and E is the elastic modulus.

It may be necessary to correlate the results of the nanoindentation technique back to the ASTM method.

Figure 11:
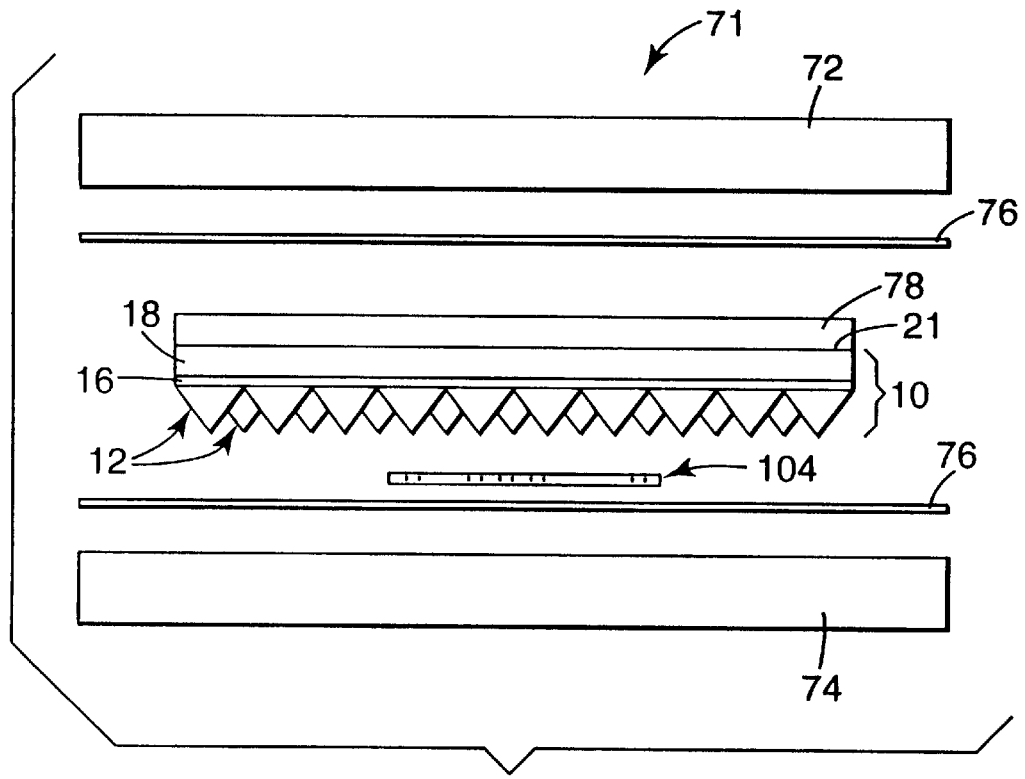
FIG. 11 is a schematic view of how a glittering retroreflective sheeting can be made in accordance with the present invention by exposing a retroreflective sheeting 10 to heat and/or pressure in a laminating apparatus 71.

FIG. 11 illustrates how to prepare a glittering cube-corner sheeting using heat and/or pressure in a batchwise process. Using this technique, a cube-corner retroreflective sheeting that contains an ordered array of cube-corner elements such as sheeting 10 may be placed in a platen press or laminator 71 that includes first and second pressure-applying surfaces 72 and 74. The laminator may be, for example, a Hix model N-800 heat transfer machine available from Hix Corporation of Pittsburg, Kans.

A Hix N-800 laminator has a first pressure-applying surface 72 that is made of metal and that may be heated to temperatures as high as 500° F. The second pressure-applying surface 74 is an unheated rubber mat. In operation, two layers of release paper 76 may optionally be disposed between the surfaces 72 and 74 and the cube-corner sheeting 10. A carrier 78 (such as made from polyester) may be disposed on the cube-corner sheeting's front surface 51. Carrier 78 is a byproduct of the process used to produce sheeting 10 (see, for example, U.S. Pat. No. 5,691,846 at the discussion describing its FIG. 4, where the carrier is represented by numeral 28) and may optionally remain thereon until after the cube-corner elements have been rearranged from exposure to heat and/or pressure.

When the ordered, non-glittering cube-corner sheeting and optional release paper 76 are arranged in the heat lamination machine as shown in FIG. 11, the machine is activated so that the pressure-applying surfaces 72 and 74 move toward each other and hold the ordered cube-corner sheeting at a desired temperature and pressure for a predetermined time. If desired, the lower release paper 76 in FIG. 11 may be omitted, and the pattern or image of the lower, unheated surface 74 of the heat laminating machine may be transferred to the retroreflective sheeting in a glittering pattern. In lieu of a laminating machine, a vacuum former— such as a Scotchlite™ Heat Lamp Applicator available from Dayco Industries, Inc., Miles, Mich.; P.M. Black Co., Stillwater, Minn.; and Converting Technologies, Inc., Goodard, Kans.—may be used.

The amount of heat and/or pressure applied to a cube-corner sheeting 10 may vary depending on the materials from which the cube-corner sheeting is made. It has been discovered in this invention that when polymeric materials having an elastic modulus of about $10\times10^8$ to $25\times10^8$ are used in the cube-corner elements 12 (and an optional land layer 16), and a polymeric material having an elastic modulus of about $0.05\times10^8$ to $13\times10^8$ pascals is used in the body layer 18, the cube-corner sheeting, preferably, is heated to a temperature of about 300° to 400° F. (150° to 205° C.) and that about $7\times10^4$ to $4.5\times10^5$ pascals (10 to 60 psi) of pressure are applied to the article. More particularly, when cube-corner elements are employed that are made from 1,6-hexanediol diacrylate, trimethylolpropane triacrylate, bisphenol A epoxy diacrylate in a ratio of 25 parts to 50 parts to 25 parts, respectively, and containing one weight percent (based on resin weight) of Darocur™ 4265 photoinitiator (Ciba Geigy) and having an elastic modulus of about $16\times10^8$ to $20\times10^8$ pascals, and the body layer is made from a plasticized poly(vinyl chloride) film having an elastic modulus of around $0.2\times10^8$ to $1\times10^8$ pascals, the cube-corner sheeting preferably is exposed to temperatures of about 320° to 348° F. (160° to 175° C.) and pressures of about $1.4\times10^5$ to $2.8\times10^5$ pascals (20 to 40 psi). Using polymers that have a relatively high elastic modulus, for example, greater than $16\times10^8$ pascals, the geometry of each cube, namely, its internal dihedral angles, are generally maintained to within a couple of degrees.

Figure 12:
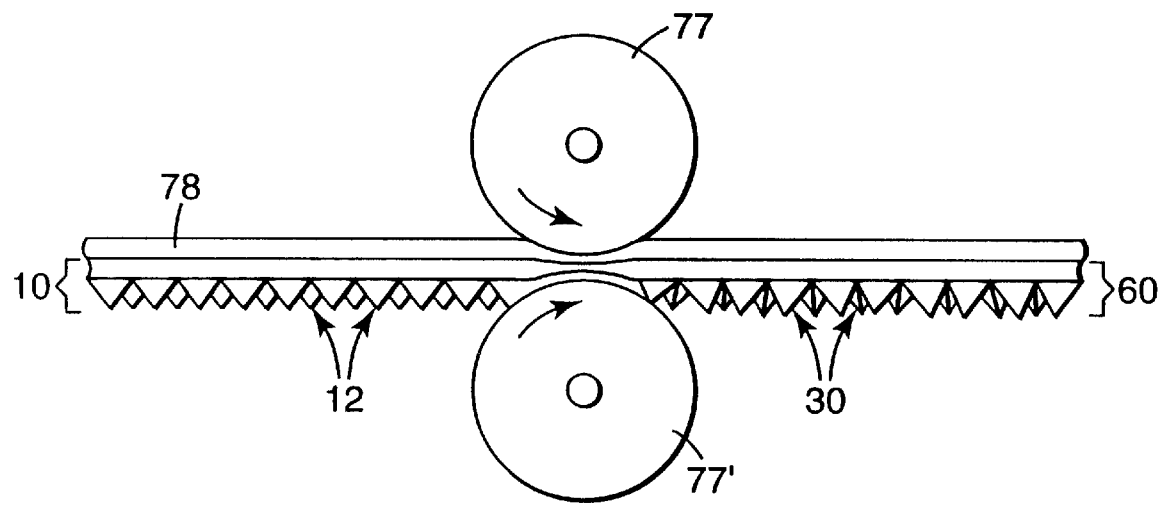
FIG. 12 is a schematic view of an alternative method of exposing a retroreflective sheeting 10 to heat and/or pressure to produce a glittering retroreflective sheeting 60 in accordance with the present invention.

In FIG. 12, a continuous method is shown for applying heat and/or pressure to a retroreflective sheeting 10 to produce a glittering sheeting 60. In this method, the retroreflective sheeting 10, having the optional carrier film 78 disposed thereon, is fed through the nip formed by rolls 77 and 77'. As shown, cube-corner elements 12 are in a non-random, ordered configuration before being exposed to the heat and/or pressure from rolls 77 and 77', but after exiting the rolls they are randomly tilted, and the dihedral angles formed between adjacent cube-corner elements vary along each groove in the array. The base planes of each cube-corner element also do not reside in the same general plane. The sheeting 60 that exits the rolls is capable of producing a glittering effect, whereas the cube-corner sheeting 10 that has not been exposed to sufficient amounts of heat and/or pressure is incapable of producing such an effect. The amounts of heat and/or pressure that may be used in this continuous method are similar to those used in the batchwise method for similar starting materials. When using heat, either or both rolls 77 and 77' may be heated to the temperature sufficient to alter the cube configuration.

In the second technique for producing a glittering cube-corner retroreflective sheeting, a mold may be used that is a negative of a glittering cube-corner sheeting. Such a mold may be made from a glittering cube-corner retroreflective sheeting that is produced by the first technique described above. That is, the structured surface or backside of an array of, for example, randomly-tilted cube-corner elements can be used as a pattern to produce the mold. This can be accomplished, for example, by depositing suitable mold material(s) onto the back side of an array of randomly tilted cube-corner elements and allowing the mold material(s) to harden in place. The randomly tilted cube-corner sheeting that is used as the pattern may then be separated from the newly formed mold. The mold is then capable of producing cube-corner sheetings that glitter.

As an alternate method of producing a mold, a diamond tool may be used to fashion the array of cube-corner elements. This may be accomplished by, for example, using a number of diamond cutting tools, each tool being able to cut the groove which forms one of the desired dihedral angles between adjacent cube-corner elements. Groove depth and angle between adjacent cube-corner element faces in any single groove is determined by the profile of the diamond cutting tool that is used to cut the mold material.

To prepare a mold having cube-corner elements with varying dihedral angles between faces of adjacent cube-corner elements along the groove, it is necessary to position a diamond cutting tool capable of cutting the first desired dihedral angle, insert it into the mold material and cut the groove portion that extends from one groove intersection to the adjacent groove intersection. The tool is then removed from the mold material, and the diamond cutting tool is replaced by a tool that is capable of cutting the next desired dihedral angle along the groove. The newly selected tool is then positioned in the growing groove as close as possible to the location where the first cutting tool finished cutting. Cutting the groove is then continued with the second cutting tool until the next groove intersection is reached. The second cutting tool is then removed from the mold material and replaced with a cutting tool capable of cutting the third desired dihedral angle in preparation for cutting the next groove portion. This process is continued for the length of the groove. After completion of the first groove, the next or adjacent groove may be cut in the same manner using various cutting tools and incremental cuts until the desired number of parallel, or generally parallel, grooves have been completed.

After the first set of grooves is complete, the diamond cutting tool is adjusted so that the second set of parallel grooves may be cut such that they intersect with the first set and contain varying dihedral angles between adjacent cube-corner faces. This process is continued until the desired number of sets of generally parallel grooves are cut into the mold material.

A mold also may be produced using pin bundling techniques. Molds manufactured using pin bundling are made by assembling together individual pins that each have an end portion shaped with features of a cube-corner retroreflective element. U.S. Pat. No. 3,632,695 to Howell and U.S. Pat. No. 3,926,402 to Heenan et al. disclose illustrative examples of pin bundling. A plurality of pins are typically fashioned to have an optically active surface on one end disposed at an oblique angle to the longitudinal axis of the pin. The pins are bundled together to form a mold having a structured surface in which the optical surfaces combine to form the cube-corner elements. The mold may be used to form retroreflective sheeting or to generate other molds useful in manufacturing cube-corner sheeting. Pins may be arranged such that the dihedral angle between optical faces of adjacent cube-corner elements vary. One advantage associated with pin bundling techniques is that the dihedral angle may be varied in a single groove set, or in two or more groove sets. The pins also can be configured such that there are no generally parallel grooves and/or such that the cube-corner elements do not possess base planes that are parallel to one another when the resulting sheeting is laid flat. Pin bundling thus can provide additional flexibility in producing glittering retroreflective sheeting.

Figure 13:
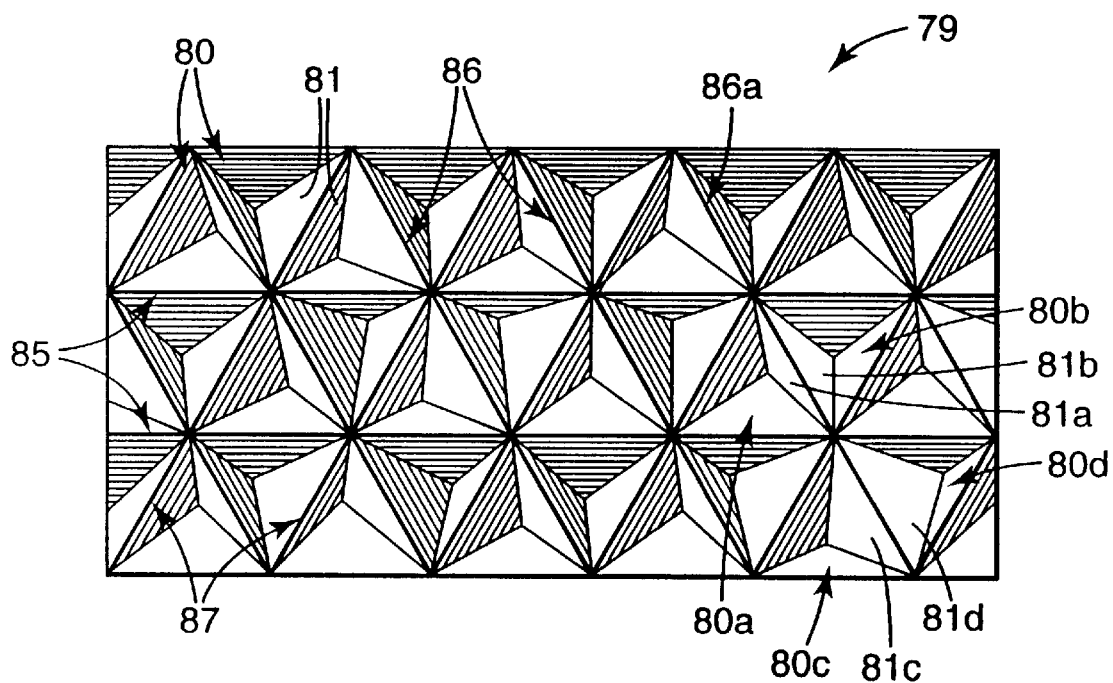
FIG. 13 is a top view of a mold 79 that may be used to produce a glittering retroreflective sheeting in accordance with the present invention.

FIG. 13 illustrates a mold 79 that is a negative of an array of cube-corner elements that comprise a glittering retroreflective sheeting. The mold (also referred to in the art as a tool) therefore may possess three sets of generally parallel N-shaped grooves 85, 86, and 87, and the planar faces 81 of adjacent cube-corner elements 80 can form dihedral angles that vary in dimension along each groove in the mold's array. For example, in groove 86a, faces 81a and 81b of adjacent cubes 80a and 80b form a tighter dihedral angle α (FIG. 5) than faces 81c and 81d of cubes 80c and 80d. The mold may be essentially the same as the array of cube-corner elements of the invention with the exception of being a negative thereof, and since it may not need to transmit light or be conformable, it may be made from an opaque material that is relatively inflexible, for example, metal. A mold useful for producing glittering retroreflective sheetings of the invention is described in U.S. patent application No. 08/640,383, filed Apr. 30, 1996 pending.

Figure 14:
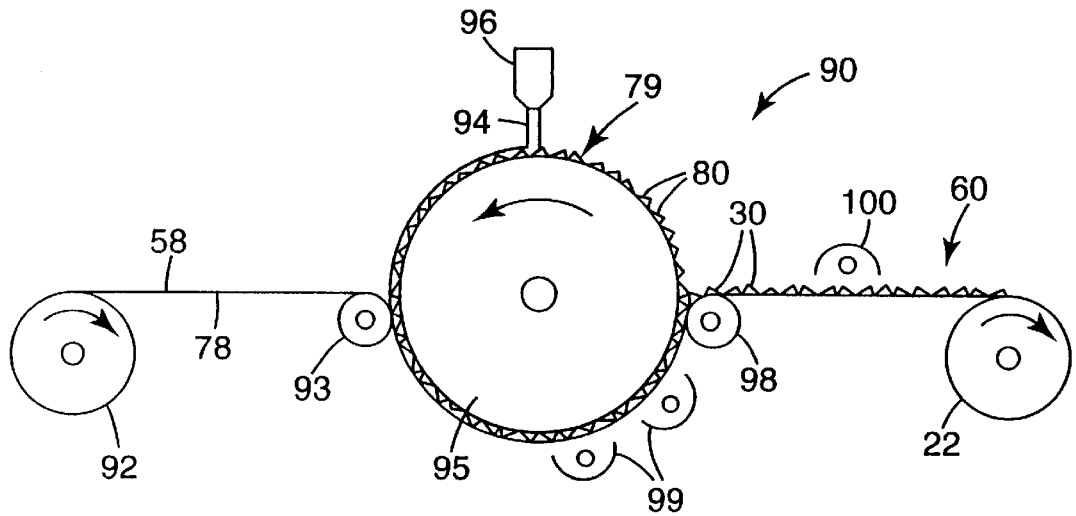
FIG. 14 is a schematic view of a second technique for making a retroreflective sheeting 60 in accordance with the present invention by casting the sheeting from a mold 79.

FIG. 14 schematically shows how a structured article that is capable of glittering and retroreflecting light may be formed from a mold 79 that is adapted to continuously produce glittering sheeting 60. The method includes an apparatus, shown generally as 90, for casting and curing composite sheeting 60. As shown, body layer 58 is drawn from a roll 92 to a nip roller 93 such as a rubber coated roller. At roller 93, the body layer 58 contacts a suitable resin formulation 94 previously applied to an endless patterned mold 79 on a roll 95 (or other suitable endless carrier that forms a loop, e.g. a belt) through a coating die 96. The excess resin 94 extending above the cube-corner elements 80 may be minimized by setting nip roller 93 to a width setting that is effectively less than the height of the cube-corner forming elements of mold 79. In this fashion, mechanical forces at the interface between nip roller 93 and mold 79 ensure that a minimum amount of resin 94 extends above the mold elements 80. Depending on its flexibility, the body layer 58 may be optionally supported with a suitable carrier film 78 that provides structural and mechanical integrity to the body layer 58 during casting and curing, and which is stripped from the body layer 58 after the sheeting is removed from the mold 79 at roll 98. Use of a carrier film 78 is preferred for low modulus body layers 58.

The method shown in FIG. 14 may be altered such that the resin 94 is applied to the body layer 58 first rather than being first deposited on the mold 79. This embodiment for a continuous process is discussed in U.S. Pat. No. 5,691,846 with reference to its FIG. 5.

As shown in FIG. 14, the resin composition that forms the array of cube-corner elements can be cured in one or more steps. Radiation sources 99 expose the resin to actinic radiation, such as ultraviolet light or visible light, depending upon the nature of the resin, in a primary curing step. The actinic radiation from source 99 irradiates the resin through the layer 58—thus imposing a requirement that the body layer 58 transmit radiation to allow curing to occur. Alternatively, curing can be performed by irradiation through the mold 79—if the mold used is sufficiently transparent to transmit the selected radiation. Curing through both the tool and the body layer also may be carried out.

The primary curing may completely cure the cube-corner elements, or may partially cure the resin composition to a degree sufficient to produce dimensionally stable cube-corner elements that no longer require the support of the mold 79. The sheeting 60 can then be removed from the mold 79, exposing the sheeting's cube-corner elements 30. One or more secondary curing treatments 100, selected depending upon the nature of the resin, can then be applied to fully cure the array of cube-corner elements and strengthen the bond between the array of cube-corner elements and the body layer. This bifurcated curing approach cam permit optimized processing and materials selection. For instance, a sheeting made from a body layer that contains an ultraviolet absorber (to impart greater durability and weathering ability) can be made by applying a primary curing treatment of visible light through the light-transmissible body layer, and then removing the sheeting from the mold 79 at roll 98 and applying a second curing treatment 100 of ultraviolet radiation to the exposed cube-corner elements. Such a bifurcated approach may permit faster overall production.

The extent of the second curing step depends on a number of variables, among them the rate of feed-through of the materials, the composition of the resin, the nature of any crosslinking initiators used in the resin formulation, and the geometry of the mold. In general, faster feed rates increase the likelihood that more than one curing step is needed. Selection of curing treatments depends in large part on the specific resin chosen for producing the cube-corner elements. Electron beam curing could be used, for example, in lieu actinic radiation.

Thermal curing materials also may be used when making glittering retroreflective sheeting from a mold of the invention. In this case, the mold is heated to a temperature sufficient to cause development of enough cohesion in the newly formed glittering cube-corner material to allow it to be removed from the mold without damaging the physical or optical properties of the newly formed sheeting. The selected temperature is a function of the thermal curing resin. Thermal curing may be achieved, for example, by heating the resin, by heating the mold, or by heating the glittering sheeting by indirect means. Combinations of these methods also may be used. Indirect heating includes methods such as heating with lamps, infrared or other heat source filaments, or any other convenient method. The mold may also be housed in an oven or other environment that is maintained at the temperature required by the thermal curing resin selected.

After the glittering retroreflective sheeting has been removed from the mold, it may be further treated by exposure to heat from an oven or other heated environment. Such subsequent heat treatment may adjust the sheeting's physical or other properties to some desired state, complete reactive processes in the sheeting, or remove volatile substances such as solvents, unreacted materials, or by-products of the thermal curing system.

Thermal curing resins may be applied to the mold as solutions or as neat resin formulations. Resins also may be either reactively extruded or extruded in the molten state onto the mold. Methods of thermal curing after applying the resins to the mold, and any subsequent exposure of the sheeting to heat, may be done independent of applying the thermal curing resin to the mold.

An advantage of glittering retroreflective sheeting made from thermal curing materials in a mold is that both the cube-corner elements 30 (FIG. 3) and body portion 54 (FIG. 5) may be made from the same substance, which may be applied to the mold in a single operation. A consequence of this construction is that the sheeting may exhibit uniform materials and properties throughout the sheeting. A further advantage is that constructions of this type do not require a separate body layer to be applied as illustrated in FIG. 14

In addition to curing treatments, sheeting may also be heat treated after it is removed from the mold. Heating serves to relax stresses that may have developed in the body layer or in the cube-corner elements, and to drive off unreacted moieties and byproducts. Typically, the sheeting is heated to an elevated temperature, for example, above the polymer's glass transition temperature(s). The sheeting may exhibit an increase in retroreflective brightness after a heat treatment.

In lieu of the above methods, glittering retroreflective sheetings also may be produced by embossing a polymeric sheet over a mold that possesses cube-corner elements arranged in accordance with the present invention. Examples of embossing methods are disclosed in U.S. Pat. Nos. 5,272,562, 5,213,872, and 4,601,861.

Glittering retroreflective sheetings that display images also may be produced in accordance with the present invention.

Figure 15:
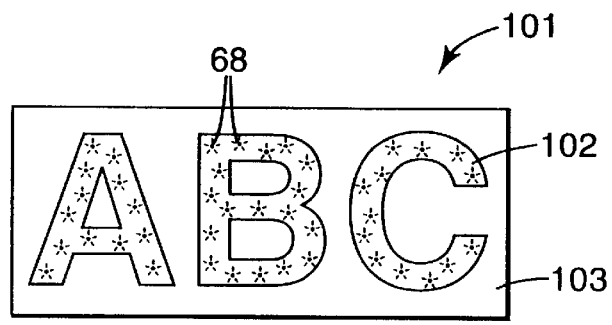
FIG. 15 is a front view of an imaged retroreflective sheeting 101 that has glittering and non-glittering regions 102 and 103, respectively.

FIG. 15 illustrates a retroreflective article 101 that displays the image "ABC". The image 102 in this case is characterized by a retroreflective glittering area, while the background 103 is characterized by a retroreflective non-glittering area. As used herein, an "image" may be any combination of alphanumeric characters or other indicia that stands out in contrast to the background. Glittering imaged retroreflective articles, like article 101, may be produced as described below.

Imaged glittering sheeting may be produced in a first embodiment by inserting a material in the shape of the desired image into the assembly shown in FIG. 11. Thin material in the shape of the desired image, such as an insert 104 (104 refers generically to any suitable insert including 104a and 104b of FIGS. 16a and 16b) in FIG. 11 can be placed between the cube-corner reflective elements 30 and the optional lower release liner 76. The image materials may be a polymeric film made from, for example, polyester. The insert 104 may comprise a large, smooth sheet from which the desired image has been cut, forming a negative image in the insert. Subjecting this arrangement to processing conditions of elevated temperature and/or pressure results in a retroreflective sheeting that bears the desired image as a glittering portion on a background that is substantially not glittering or that has a low level of glittering. When the insert 104 is in the size and shape of the desired image, subjecting the sheeting 10 to elevated temperature and/or pressure results in retroreflective sheet material that bears a non-glittering image corresponding to the insert 104 on the glittering background. A preferred embodiment is without the release liner 76.

An insert 104 can be placed with the image forming elements in contact with exposed cube-corner elements 30 as shown in FIG. 11, or on the top face of the ordered retroreflective sheeting 10 with image forming elements 106 contacting the optional polyester film liner 78 or directly contacting the front surface 51. Alternatively, an ordered cube-corner sheeting 10 may be inserted in laminator 71 with the cube-corner elements 30 facing the heated laminator surface 72, and the front surface 51 (and optional carrier 78) facing an unheated laminator surface 74. Thus, an image forming insert may be disposed either above or below the sheeting.

Figure 16A:
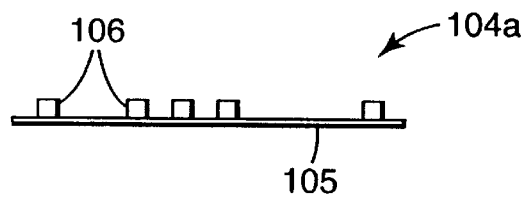
FIG. 16a is a side view of an insert 104a that may be used to produce an image in a glittering sheeting.

In FIG. 16a an image insert 104a is shown that may comprise a durable material 105 that bears projections 106 rising away from the surface of the sheet material 105. In this embodiment, the projections 106 form the desired image. An example of such a device is a flexographic printing plate. When this type of image bearing device is placed in the arrangement of FIG. 11 such that the image forming projections 106 of insert 104a contact the exposed cube-corners and the assembly is subjected to elevated temperature and/or pressure, a retroreflective sheeting is produced that bears a glittering image on a substantially non-glittering background.

The degree and extent of glittering may be controlled by the process conditions. For example, processing with a flexographic printing plate for short time periods results in an image that is capable of glittering only at the points where projections 106 directly contact the backside of the cube-corner elements 30. Non-contact areas remain retroreflective and substantially not glittering. As processing time increases, and as processing temperature increases, the extent of glittering extends away from the contact points of projections 106, and the resulting image gradually changes from (a) glittering only at contact points to (b) a glittering image on a glittering background, to (c) a non-glittering image (where cube-corners have been substantially pushed out of the contact areas) on glittering background.

Figure 16B:
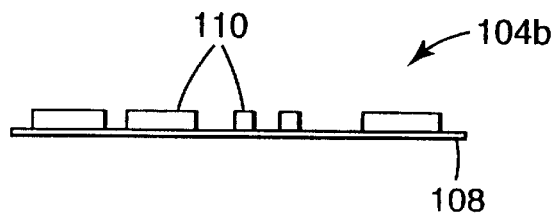
FIG. 16b is a side view of an insert 104b that may be used to produce an image in a glittering sheeting.

In FIG. 16b, an image forming element 104b is shown that may comprise a carrier material 108 on which a heat-transferrable material 110 has been deposited in the shape and size of the desired image. For example, heat-transferrable ink 110 may be deposited on a carrier film 108 in the form of the image to be transferred. The carrier film 108 bearing the desired image is placed as an insert 104 in a laminator 71 of FIG. 11 such that the exposed back side of the cube-corner elements 30 contacts the image surface 110 on carrier film 108. The arrangement is subjected to the processing conditions of elevated temperature and/or pressure, and the resulting retroreflective sheeting bears a non-retroreflective image on a glittering retroreflective background.

The image bearing insert 104 in FIG. 11 also may be a large piece of fabric (not shown) or other material bearing an overall pattern or texture. In the case of a fabric insert, the image carried by the insert is derived from the fabric's configuration. Additionally, the image on the sheeting may correspond to an image cut from the fabric. When a fabric type insert is placed in contact with the exposed back side of the cube-corner elements 30 and the arrangement is subjected to elevated temperature and/or pressure, the resulting retroreflective cube-corner sheeting bears an overall image that is capable of glittering and that exhibits the configuration or texture of the fabric. Further, the fabric's texture or weave can enhance the glittering effect in the imaged area. Coarse fabrics tend to encourage more glittering. If desired, the lower release paper 76 in FIG. 11 may be removed completely, and the pattern or image of the lower, unheated surface 74 of the heat laminating machine may be transferred to the retroreflective sheeting in a glittering pattern.

There is broad latitude in producing images by contacting the ordered cube-corner retroreflective sheeting with an image forming element. The appearance of the image depends on process conditions, the construction from which the imaged glittering sheeting is made, and on the size, shape, and materials of the image forming elements. The degree of glittering in imaged and in nonimaged areas may be successfully altered when one or more of these variables is changed. When the image forming element 104 is, for example, a textured surface such as fabric—such as a woven polyester mesh—the glittering effect may be considerably enhanced when compared with the glittering sheeting prepared in the absence of such a textured surface. Photomicrographs of sheeting with enhanced glittering showed a substantially greater degree of cube-corner element reorientation, including groups of cube-corner elements piled upon each other, than sheeting formed in the absence of a textured image forming element. It is believed that the enhanced glittering effect is related to the additional reflective paths available to light incident on the piled cube-corner elements. Accordingly, there is a general range of glittering image forming abilities of the article of the invention which can be achieved by changing these or other variables.

A retroreflective sheeting capable of displaying the glittering effect, prepared from either the first or second technique described above, may also be made to bear an image by printing directly onto the outer surface 51 of the body layer 58. When transparent inks are used, the glittering effect and retroreflection are visible through the transparent image and are dominated by that color. When opaque inks are used, the retroreflection and the glittering effects are blocked only at the image area when viewed from the front side of the sheeting. Transparent and opaque inks also may be placed on the backside of the cube-corner elements to produce images.

Retroreflective sheetings capable of glittering and bearing images also may be prepared by the second technique, directly from a mold. Essentially any method used to prepare retroreflective sheetings that display glittering images on a non-glittering background or non-glittering images on a glittering background according to the first technique (FIG. 11) is also applicable to the second technique (FIG. 14). When a glittering image is located on a glittering background, the imaged area and the background exhibit varying degrees of glitter so that the imaged area is discernible from the background. A glittering retroreflective sheeting that displays an image may be used as a pattern on which mold materials are deposited and/or cured. Removal of the patterned sheeting reveals a newly formed mold that bears the image formed on the pattern material. Use of such molds produces sheeting that is capable of retroreflecting light and that displays the glittering effect and still contains the image applied to the original sheeting from which the mold was prepared. Images printed, deposited, or formed directly on the exposed back side of the cube-corner elements by various techniques may be faithfully replicated in the mold making process. Images placed on the body layer 58 may also end up being replicated in the mold making process.

Light transmissible polymeric materials may be used to produce a retroreflective sheetings of the invention. Preferably the selected polymers can transmit at least 70 percent of the intensity of the light incident upon it at a given wavelength. More preferably, the polymers transmit greater than 80 percent, and still more preferably greater than 90 percent, of the incident light.

For some applications, particularly when producing a glittering article according to the first technique (that is, using heat and/or pressure), the polymeric materials that are employed in the cube-corner elements preferably are hard and rigid. The polymeric materials may be, for example, thermoplastic or crosslinkable resins. The elastic modulus of such polymers preferably is greater than about $10 \times 10^8$ pascals, and more preferably is greater than about $13 \times 10^8$ pascals.

Examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyurethanes; polyesters such as poly(butylene terephthalate), poly(ethylene terephthalate); fluoropolymers such as poly(chlorofluoroethylene), poly(vinylidene fluoride); polyvinyl halides such as poly(vinyl chloride) or poly(vinylidene chloride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

The cube-corner elements also may be made from reactive resin systems that are capable of being crosslinked by a free radical polymerization mechanism by exposure to actinic radiation. Additionally, these materials may be polymerized by thermal means using a thermal initiator such as benzoyl peroxide. Radiation-initiated cationically polymerizable resins also may be used.

Reactive resins suitable for forming the cube-corner elements may be blends of a photoiniator and at least one compound bearing an acrylate group. Preferably the resin blend contains a difunctional or polyfunctional compound to ensure formation of a crosslinked polymeric network when irradiated.

Examples of resins that are capable of being polymerized by a free radical mechanism include: acrylic-based resins derived from epoxies, polyesters, polyethers, and urethanes; ethylenically unsaturated compounds; aminoplast derivatives having at least one pendant acrylate group; isocyanate derivatives having at least one pendant acrylate group; epoxy resins other than acrylated epoxies; and mixtures and combinations thereof. The term acrylate is used here to encompass both acrylates and methacrylates. U.S. Pat. No. 4,576,850 to Martens discloses examples of crosslinked resins that may be used in the cube-corner elements of glittering retroreflective sheeting.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Some examples of compounds having an acrylic or methacrylic group are listed below. The listed compounds are illustrative and not limiting.

(1) Monofunctional compounds:
ethylacrylate, n-butylacrylate, isobutylacrylate, 2-ethylhexylacrylate, n-hexylacrylate, n-octylacrylate, isooctylacrylate, isobornyl acrylate, tetrahydrofurfuryl acrylate, 2-phenoxyethyl acrylate, N,N-dimethylacrylamide;

(2) Difunctional compounds:
1,4-butanediol diacrylate, 1,6-hexanediol diacrylate, neopentylglycol diacrylate, ethylene glycol diacrylate, triethyleneglycol diacrylate, and tetraethylene glycol diacrylate, and diethylene glycol diacrylate;

(3) Polyfunctional compounds:
trimethylolpropane triacrylate, glyceroltriacrylate, pentaerythritol triacrylate, pentaerythritol tetraacrylate, and tris (2-acryloyloxyethyl)isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phthalate and diallyl adipate, and amides of carboxylic acids such as and N,N-diallyladipamide.

Examples of photopolymerization initiators that may be blended with the acrylic compounds include the following illustrative initiators: benzyl, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzyl methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, (2,4,6-trimethylbenzoyl) diphenylphosphine oxide, 2-methyl-1-4-(methylthio) phenyl-2-morpholino-1-propanone, bis(2,6-dimethoxybenzoyl)-2,4,4-trimethylpentylphosphine oxide, et cetera. These compounds may be used individually or in combination.

Cationically polymerizable materials include but are not limited to materials containing epoxy and vinyl ether functional groups. These systems are photoinitiated by onium salt initiators such as triarylsulfonium, and diaryliodonium salts.

Preferred polymers for use in the cube-corner elements include poly(carbonate), poly(methylmethacrylate), poly (ethylene terephthalate), aliphatic polyurethanes and crosslinked acrylates such as multi-functional acrylates or acrylated epoxies, acrylated polyesters, and acrylated urethanes blended with mono- and multi-functional monomers. These polymers are preferred for one or more of the following reasons: thermal stability, environmental stability, clarity, release from the tooling or mold, or high receptivity for receiving a reflective coating.

The polymeric materials employed in a land layer, if one is present, may be the same as the polymers that are employed in the cube-corner elements. The optional land layer preferably has a smooth interface with the cubes and the body layer. Cavities and/or interfacial roughness preferably are avoided between the cubes and the optional land layer or the body layer so that optimum brightness can be displayed by the retroreflective sheeting when light is retroreflected therefrom. A good interface prevents spreading of retroreflective light from refraction. When present, the land layer, in most instances, is integral with the cube-corner elements. By "integral" is meant the land and cubes are formed from a single polymeric material—not two different polymeric layers subsequently united together. The polymers that are employed in the cube-corner elements and land layer can have refractive indices that are different from the body layer. Although the land layer desirably is made of a polymer similar to that of the cubes, the land layer also may be made from a softer polymer such as those described above for use in the body layer.

The body layer may comprise a low elastic modulus polymer for easy bending, curling, flexing, conforming, or stretching, and for allowing the cube-corner elements to become reoriented when an ordered array is exposed to heat and pressure. The elastic modulus may be less than $5\times10^8$ pascals, and may also be less than $3\times10^8$ pascals. A low elastic modulus body layer, however, is not always required. If it is desired to make glittering retroreflective sheetings which are less flexible, sheetings with body layer having higher elastic modulus may be used, such as rigid vinyl with elastic modulus about 21 to $34\times10^8$ Pa. Generally, the polymers of the body layer have a glass transition temperature that is less than 50° C. The polymer preferably is such that the polymeric material retains its physical integrity under the conditions to which it is exposed during processing. The polymer desirably has a Vicat softening temperature that is greater than 50° C. The linear mold shrinkage of the polymer desirably is less than 1 percent, although certain combinations of polymeric materials for the cube-corner elements and the body layer may tolerate a greater degree of shrinking of the body layer polymer. Preferred polymeric materials that are used in the body layer are resistant to degradation by UV light radiation so that the retroreflective sheeting can be used for long-term outdoor applications. As indicated above, the materials or polymer body layer is light transmissible and preferably is substantially transparent. Body layer films with a matte finish—that became transparent when the resin composition is applied thereto, or that become transparent during the fabrication process, for example, in response to the curing conditions used to form the array of cube-corner elements—are useful. The body layer may be either a single layer or a multi-layer component as desired. Examples of polymers that may be employed in the body layer include:

fluorinated polymers such as: poly(chlorotrifluoroethylene), for example Kel-F800™ available from 3M, St. Paul, Minn.; poly(tetrafluoroethylene-co-hexafluoropropylene), for example Exac FEP™ available from Norton Performance, Brampton, Mass.; poly(tetrafluoroethylene-co-perfluoro(alkyl)vinylether), for example, Exac PEA™ also available from Norton Performance; and poly(vinylidene fluoride-co-hexafluoropropylene), for example, Kynar Flex-2800™ available from Pennwalt Corporation, Philadelphia, Pa.;

ionomeric ethylene copolymers such as: poly(ethylene-co-methacrylic acid) with sodium or zinc ions such as Surlyn-8920™ and Surlyn-9910™ available from E.I. dupont Nemours, Wilmington, Del.;

low density polyethylenes such as: low density polyethylene; linear low density polyethylene; and very low density polyethylene;

plasticized vinyl halide polymers such as plasticized poly(vinyl chloride);

non- or unplasticized rigid vinyl polymers such as Pentaprint™ PR 180 from Klockner Pentaplast of America, Inc., Gordonsville, Va.;

polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n$— where n is 0–12, and poly(ethylene-co-vinylacetate); and aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether glycol, polyethylene glycol, polycaprolactone diol, poly-1,2-butylene oxide glycol, and combinations of these polydiols, and (3) chain extenders such as butanediol or hexanediol. Commercially available urethane polymers include: PN-04, or 3429 from Morton International Inc., Seabrook, N.H., or X-4107 from B.F. Goodrich Company, Cleveland, Ohio.

Combinations of the above polymers also may be employed in the body layer of the body portion. Preferred polymers for the body layer include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinyl chloride); and the aliphatic urethanes. These polymers are preferred for one or more of the following reasons: suitable mechanical properties, good adhesion to the land layer or cube-corner elements, clarity, and environmental stability.

Selection of certain resins for the cube-corner elements and the body layer may result in an interpenetrating network after curing. Particular combinations of resins for cube-corner elements and body layer can be readily screened for penetration by application of a quantity of the cube-corner resin to the body layer. Priola, A., Gozzelino, G., and Ferrero, F., *Proceedings of the XIII International Conference in Organic Coatings Science and Technology,* Athens, Greece, Jul. 7–11, 1987, pp. 308–18, discloses a watch glass test suitable for this purpose. See also U.S. patent application Ser. No. 07/472,444 filed Jun. 7, 1995.

In an embodiment that contains polycarbonate cube-corner elements and/or a polycarbonate land layer and a body layer that contains a polyethylene copolymer such as poly(ethylene-co-(meth)acrylic acid), poly(ethylene-co-vinylacetate) or poly(ethylene-co-acrylate), the interfacial adhesion between the body layer and the land layer or cube-corner elements can be improved by placing a thin tie-layer (not shown) therebetween. The tie-layer can be applied on the body layer before laminating the body layer to the land layer or to the cube-corner elements. The tie-layer can be applied as a thin coating using, for example: an aliphatic polyurethane in organic solution, for example Permuthane™ U26-248 solution, available from Permuthane Company, Peabody, Mass.; Q-thane™ QC-4820 available from K.J. Quinn and Co., Inc., Seabrook N.H.; an aliphatic polyurethane waterborne dispersion, for example NeoRez™ R-940, R-9409, R-960, R-962, R-967, and R-972, available from ICI Resins US, Wilmington, Mass.; an acrylic polymer water borne dispersion, for example, NeoCryl™ A-601, A-612, A-614, A-621, and A-6092, available from ICI Resins US, Wilmington, Mass.; or an alkyl acrylate and aliphatic urethane copolymer water borne dispersion, for example NeoPac™ R-9000, available from ICI Resins US, Wilmington, Mass. In addition, an electrical discharge method, such as a corona or plasma treatment, can be used to further improve the adhesion of tie-layer to the body layer or the tie-layer to the land layer or to the cube-corner elements.

Cube-corner retroreflective sheetings that are produced in accordance with the second technique may be made from polymers discussed above as being applicable in the first technique. That is, the cube-corner elements may comprise harder, or high modulus polymer(s) and the body portion may comprise softer, or lower modulus polymer(s). In addition to these materials, cube-corner sheetings that comprise harder body layer polymers such as polyesters or polycarbonates may also be made by the second technique. Further, when sheeting is made by the second technique the chemistry applicable to the cube-corner elements is broader than in the first technique, that is, cube-corner elements may comprise either hard or soft polymers. U.S. patent application Ser. No. 08/625,857 to Wilson et al. (filed Apr. 1, 1996) discloses examples of polymers that may be used in the cube-corner elements of the present invention.

When an article of the invention is prepared in accordance with the second technique, soft polymers—that is, polymers having an elastic modulus less than $10 \times 10^8$ pascals—may be used to produce the cube-corner elements in glittering retroreflective sheeting. In the second technique, the cube-corner elements are not subjected to the heat and/or pressure conditions of the batchwise or continuous processes of the first technique because the cube-corner element orientations are determined by the configuration of the mold. That is, glittering sheetings made by the second technique receive cube-corner element orientations directly from the mold. Distortion of the cube-corner elements therefore is much less a concern, and it is possible to produce glittering sheetings that comprise only, or consist essentially of, soft polymers throughout the construction.

Example of soft polymers that can be used to make glittering cube-corner sheeting using the second technique include flexible poly(vinyl halides) such as poly(vinyl chloride), poly(vinylidene chloride); PVC-ABS; reactive and nonreactive vinyl resins; vinyl acrylates; mixtures of vinyl acrylates with acrylated epoxies; polysiloxanes; alkylalkoxysilanes; acrylated polysiloxanes; polyurethanes; acrylated urethanes; polyesters; acrylated polyesters; polyethers; acrylated polyethers; acrylated oils; poly (tetrafluoroethylene); poly(fluoroethylene-co-fluoropropylene); poly(ethylene-co-tetrafluoroethylene); polybutylene; polybutadiene; poly(methylpentene); polyethylenes such as low density, high density, and linear low density; poly(ethylene-co-vinyl acetate); poly(ethylene-co-ethyl acrylate).

These polymers can be used either alone or may be blended together. Further, they can be blended with those described for the first technique to give glittering cube-corner retroreflective sheeting via the second technique. In addition, adjusting the crosslink density of the reactive polymers or blends listed for the first technique can also yield soft materials. The properties of the nonreactive polymers can be adjusted by changing the concentration of additives such as plasticizer, or by selection of different polymer grades.

Colorants, UV absorbers, light stabilizers, free radical scavengers or antioxidants, processing aids such as anti-blocking agents, releasing agents, lubricants, and other additives may be added to the body portion or cube-corner elements. The particular colorant selected, of course, depends on the desired color of the sheeting. Colorants typically are added at about 0.01 to 0.5 weight percent. UV absorbers typically are added at about 0.5 to 2.0 weight percent. Examples of UV absorbers include derivatives of benzotriazole such as Tinuvin™ 327, 328, 900, 1130, Tinuvin-P™, available from Ciba-Geigy Corporation, Ardsley, N.Y.; chemical derivatives of benzophenone such as Uvinul™-M40, 408, D-50, available from BASF Corporation, Clifton, N.J., or Cyasorb™ UV531 from Cytech Industries, West Patterson, N.J.; Syntase™ 230, 800, 1200 available from Neville-Synthese Organics, Inc., Pittsburgh, Pa.; or chemical derivatives of diphenylacrylate such as Uvinul™-N35, 539, also available from BASF Corporation of Clifton, N.J. Light stabilizers that may be used include hindered amines, which are typically used at about 0.5 to 2.0 weight percent. Examples of hindered amine light stabilizers include Tinuvin™-144, 292, 622, 770, and Chimassorb™-944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as Irganox™-1010, 1076, 1035, or MD-1024, or Irgafos™-168, available from the Ciba-Geigy Corp., Ardsley, N.Y. Small amount of other processing aids, typically no more than one weight percent of the polymer resins, may be added to improve the resin's processibility. Useful processing aids include fatty acid esters, or fatty acid amides available from Glyco Inc., Norwalk, Conn., metallic stearates available from Henkel Corp., Hoboken, N.J., or Wax E™ available from Hoechst Celanese Corporation, Somerville, N.J. Flame retardants—such as Tetrabromo Bisphenol A Diacrylate Monomer, SR 640, from Sauromer Company, Inc., Exton, Pa., or Tricresyl phosphate, Kronitex™ TCP, from FMC Corporation, Philadelphia, Pa.—also may be added to the polymeric materials of the inventive sheeting to optimize its overall properties, as well as the properties of the article to which it may be attached.

Flexible glittering retroreflective sheeting may be used on irregular surfaces such as corrugated metal. For example, the sheeting may be placed over the sidewall of a truck trailer or on a flexible surface such as an article of clothing. Other applications for such glittering retroreflective sheeting include warning flags, road signs, traffic cones, light wands, and vehicle conspicuity markings. When used on light wands, the sheeting may be placed in a tubular configuration. For example, the sheeting can be adapted in the form of a tube or cylinder, and a light source may be directed into the tubular glittering article. The tubular glittering sheeting may be adapted with a fitting that allows it to be secured to a light source such as at the end of a flashlight. Glittering retroreflective sheetings also may be embossed or otherwise adapted into three dimensional structures as taught in U.S. patent application Ser. No. 08/641,126 entitled "Formed Ultra-Flexible Retroreflective Cube-Corner Composite Sheeting with Target Optical Properties and Method for Making Same" filed on the same day as this patent application.

The invention is further illustrated in detail by the following Examples. While the Examples serve this purpose, it should be understood that the particular ingredients used as well as other conditions and details are not to be construed in a manner that would unduly limit the invention.

EXAMPLES

Retroreflective Brightness Test

The coefficient of retroreflection, $R_A$, was measured in accordance with standardized test ASTM E 810-93b. The valves for $R_A$ is expressed in candelas per lux per square meter ($cd \cdot lx^{-1} \cdot m^{-2}$). The entrance angle used in ASTM E 810-93b was −4 degrees, and the observation angle was 0.2 degrees. Further reference to "ASTM E 810-93b" means ASTM E 810-93b where the entrance and observation angles are as specified in the previous sentence.

Lightness Test

Lightness of the cube-corner sheeting was measured using a spectrocolorimeter according to standardized test ASTM E 1349-90. Lightness is expressed by the parameter termed Luminance Factor Y (LFY), which is defined as the lightness of the test sample relative to a perfect diffusing reflector. Zero degree illumination and 45 degree circumferential viewing were employed in determining the LFY. LFY values range from 0 to 100, where a LFY value of 0 represents black and a LFY value of 100 represents white.

Examples 1a–1ee

Batchwise Production of Glittering Article

Ordered retroreflective cube-corner sheeting prepared as described in Example 1 of U.S. patent application Ser. No. 08/472,444 filed Jun. 7, 1995, was used. The sheeting included cube-corner retroreflective elements that measured approximately 0.0035 inches (90 micrometers ($\mu$m)) from apex to base, and made from 1,6-hexanediol diacrylate, trimethylolpropane triacrylate, and bisphenol A epoxy diacrylate, in a ratio of 25:50:25 parts by weight with 1% resin weight Darocur™ 4265 as photoinitiator, a 0.01 inch (250 $\mu$m) thick clear, colorless, flexible vinyl body layer, and a polyethylene terephthalate carrier film 0.002 inches (50 $\mu$m) thick. The resin was cured through the film with a FUSION H lamp (available from Fusion UV Curing Systems, Gaithersburg, Md.) operating at 235 Watt/cm at 25 ft/min (7.6 m/min), and then postcured from the back side of the cube-corner elements with an AETEK medium pressure mercury lamp (available from AETEK International, Plainfield, Ill.) operating at 120 Watt/cm at 25 ft/min (7.6 m/min). The sheeting was placed onto Kraft release paper (Scotchcal™ SCW 98 Marking Film, 3M, Saint Paul, Minn.) with the exposed cube-corner elements pointing downward toward the paper. Together the Kraft paper and ordered cube-corner sheeting were placed onto the rubber surface of a Hix Model N-800 heat lamination machine (Hix Corporation, Pittsburg, Kans.) that was preheated to 350° F.

(175° C.), with the Kraft paper resting on the rubber surface. The lamination machine was adjusted to apply 40 psi ($2.75 \times 10^5$ pascals (Pa)) air line pressure at 350° F. (175° C.) for 45 seconds. The lamination machine was activated and, at the end of the heating period, the cube-corner sheeting was removed. After cooling to room temperature, the polyester film was removed from the body layer to reveal cube-corner retroreflective sheeting capable of glittering. Other processing conditions were used to prepare glittering retroreflective sheeting where the temperature, time, and pressure were changed. The effects of these changes on glittering and retroreflective brightness are illustrated in Table 1.

Example 1s was tested for lightness, and this sample exhibited an LFY value of 37.73.

TABLE 1

Effect of Batchwise Process
Conditions on Formation of Glittering Sheeting

| Entry | Temp (°F.) | Time (sec) | Pressure (psi) | Mean Brightness $R_A$ at (cd/lux/m$^2$) 0° | 90° | Comments |
|---|---|---|---|---|---|---|
| 1a | 195 | 45 | 50 | 528 | 440 | No glittering |
| 1b | 225 | 45 | 40 | 599 | 514 | No glittering |
| 1c | 249 | 45 | 40 | 721 | 608 | No glittering |
| 1d | 275 | 45 | 40 | 1270 | 739 | No glittering |
| 1e | 300 | 45 | 40 | 919 | 834 | No glittering |
| 1f | 324 | 45 | 40 | 543 | 582 | Slight glittering |
| 1g | 340 | 45 | 40 | 303 | 302 | Full glittering |
| 1h | 349 | 45 | 40 | 253 | 268 | Full glittering |
| 1i | 374 | 45 | 40 | 197 | 238 | Full glittering |
| 1j | 401 | 45 | 40 | 105 | 137 | Full glittering |
| 1k | 350 | 60 | 40 | 254 | 222 | Full glittering |
| 1l | 350 | 40 | 40 | 234 | 222 | Full glittering |
| 1m | 350 | 30 | 40 | 342 | 356 | Full glittering |
| 1n | 350 | 20 | 40 | 482 | 502 | Full glittering |
| 1o | 350 | 18 | 40 | 624 | 602 | Full glittering |
| 1p | 350 | 16 | 40 | 670 | 670 | Full glittering |
| 1q | 350 | 14 | 40 | 580 | 658 | Full glittering |
| 1r | 350 | 12 | 40 | 655 | 743 | Full glittering |
| 1s | 350 | 10 | 40 | 1086 | 874 | Medium glittering |
| 1t | 350 | 8 | 40 | 1357 | 860 | Medium glittering |
| 1u | 350 | 6 | 40 | 1136 | 847 | Slight glittering |
| 1v | 350 | 4 | 40 | 1245 | 789 | No glittering |
| 1w | 350 | 2 | 40 | 845 | 727 | No glittering |
| 1x | 350 | 10 | 5 | — | — | Slight glittering |

TABLE 1-continued

Effect of Batchwise Process
Conditions on Formation of Glittering Sheeting

| Entry | Temp (°F.) | Time (sec) | Pressure (psi) | Mean Brightness $R_A$ at (cd/lux/m$^2$) 0° | 90° | Comments |
|---|---|---|---|---|---|---|
| 1y | 350 | 10 | 10 | — | — | Medium glittering |
| 1z | 350 | 10 | 20 | — | — | Full glittering |
| 1aa | 350 | 10 | 30 | — | — | Full glittering |
| 1bb | 350 | 10 | 40 | — | — | Full glittering |
| 1cc | 350 | 10 | 50 | — | — | Full glittering |
| 1dd | 350 | 10 | 60 | — | — | Full glittering |
| 1ee | 350 | 10 | 70 | — | — | Full glittering |

Examples 2a–2m

Imaged Glittering Article Formed Using Flexographic Printing Plate

Ordered cube-corner retroreflective sheeting, as described in Examples 1a–1ee, was used. A sheet of Kraft release paper was placed on the rubber mat of a Hix Model N-800 heat lamination machine. On top of the paper sheet was placed a flexographic printing plate having a raised image (FIG. 16a) in the shape of the letters "JPJ" surrounded by a circle. Ordered retroreflective cube-corner sheeting having a polyester carrier on top of the body layer was placed onto the flexographic printing plate such that the backside of the cube-corner elements contacted the projecting image elements of the printing plate. A second piece of Kraft release paper was placed on top of the cube-corner sheeting. This arrangement corresponds to FIG. 11 where the flexographic plate is represented by 104. The assembly was heated to 350° F. (175° C.) with an air line pressure (psi) and for the times listed below in Table 2. When the lamination cycle ended, the lamination machine was opened and the retroreflective cube-corner sheeting was removed. When the sheeting cooled to room temperature, the optional polyester film (if used) was removed to reveal a cube-corner retroreflective sheeting capable of glittering. Several types of "JPJ" image were prepared depending on construction and processing conditions and these are outlined below in Table 2.

TABLE 2

Glittering Images Formed by Various Processing
Conditions and Configurations at 350° F. (175° C.)

| Example | Optional Polyester Carrier | Flexographic Plate Position | Air Line Pressure | Time (sec) | Image Description |
|---|---|---|---|---|---|
| 2a | Absent | Contacting cube-corners | 50 | 45 | Nearly die cut image with piled cubes adjacent. Glittering on and beside image and in background. |
| 2b | Absent | Contacting cube-corners | 20 | 3 | No die cutting. Glittering image with glittering in background, none between images |
| 2c | Absent | Contacting body layer | 20 | 20 | Very faint image, very faint glittering, Background and area between images not glittering. |
| 2d | Absent | Contacting body layer | 30 | 20 | Very faint image, very faint glittering. No glittering in background or between images. |
| 2e | Absent | Contacting body layer | 50 | 20 | Faint image, faint glittering in image shape, more than Examples 2c and 2d. No glittering in background or between images. |

TABLE 2-continued

Glittering Images Formed by Various Processing
Conditions and Configurations at 350° F. (175° C.)

| Example | Optional Polyester Carrier | Flexographic Plate Position | Air Line Pressure | Time (sec) | Image Description |
|---|---|---|---|---|---|
| 2f | Absent | Contacting body layer | 50 | 45 | Full image with complete glittering only in image shape. No glittering in background or between images. |
| 2g | Present | Contacting cube-corners | 40 | 20 | Very strong image shape, nearly die cut. Little glittering in image shape; strong glittering adjacent to image shape, in background, some between images. |
| 2h | Present | Contacting cube-corners | 40 | 6 | Strong image; much less die cutting than 2g. Glittering in image shape, background, and between images. |
| 2i | Present | Contacting cube-corners | 10 | 20 | Very strong image; less die cutting than Example 2h. Glittering in image shape, background, and some between images. Piled glittering cube-corners. |
| 2j | Present | Contacting cube-corners | 10 | 3 | Strong image, glittering in image shape, no piled cube-corners. Much less glittering in background and between images than Example 2i. |
| 2k | Present | Contacting cube-corners | 20 | 3 | Strong image, glittering in shape of image, no piled cube-corners. More glittering in background and between images than Example 2j. |
| 2l | Present | Contacting cube-corners | 20 | 6 | Strong image, glittering in shape of image, no piled cube-corners. More background and between image glittering than Example 2k, much more than Example 2j. |
| 2m | Present | Contacting polyester carrier | 40 | 20 | Image extremely faint and not fully formed. No glittering anywhere. |

Examples 3a–3f

Creation of Images Using a Polyester Film

Ordered retroreflective cube-corner sheeting and the apparatus described in Examples 1a–1ee above were used in the absence of the lower release paper 76. Polyester film of several thicknesses was used as the image forming element 104 and was positioned so that it touched the back side of the cube-corner elements. To make positive images on glittering sheeting, the shape of the geometric figures of a square, a circle, and a triangle (each approximately 0.5 inch (1.25 cm) in outside dimension) were cut from a 4×6 inch sheet of polyester film of known thickness. The resulting polyester film image forming element was positioned as 104 as shown in FIG. 11. To make negative images on glittering, textured sheeting, the geometric figures that had been cut out to make the positive image forming element were placed directly on the unheated laminator surface 74. The images were formed in the glittering textured cube-corner retroreflective sheeting by operating the heat lamination machine at 350° F. for 45 seconds at a line pressure of 40 psi (2.75×10$^5$ Pa). Descriptions of the imaged sheetings are listed in Table 3.

TABLE 3

Formation of Images with Polyester Film Image Forming Elements

| Example | Image Type | Thickness of Polyester Image Forming Element (μm) | Description of Image and Background |
|---|---|---|---|
| 3a | Positive | 180 | Very strong textured and glittering effect in the shape of the cut out geometric figures on a slightly glistening background. Both image and background are retroreflective. Image exhibits rainbow effect, background does not. |
| 3b | Negative | 180 | Slightly glistening to unchanged image of the geometric figures on a strongly textured and glittering background. Both image and background are retroreflective; only background exhibits rainbow effect. |
| 3c | Positive | 100 | Very strong textured, glittering image in the shape of the geometric figures on a glistening background. Image and background are retroreflective; only glittering, textured image background exhibits rainbow effect. |
| 3d | Negative | 100 | Slightly glistening image in shape of geometric shapes on a strongly textured and glittering background. Image and background are both retroreflective; only glittering, textured background exhibits rainbow effect. |

TABLE 3-continued

Formation of Images with Polyester Film Image Forming Elements

| Example | Image Type | Thickness of Polyester Image Forming Element ($\mu$m) | Description of Image and Background |
|---------|------------|-------------------------------------------------------|-------------------------------------|
| 3e | Positive | 50 | Strongly textured and glittering image in the shape of the geometric figures on a glistening background with large irregular portions of the background exhibiting glittering and rainbow effect. Background and images were both retroreflective. |
| 3f | Negative | 50 | Glistening image in the shape of the geometric figures on a strongly textured and glittering background. Image and background are both retroreflective; only textured, glittering background exhibits rainbow effect. |

Example 4

Creation of Image Using Transfer Ink

Ordered retroreflective cube-corner sheeting and the apparatus described in Examples 1a–1ee were used with optional polyester carrier in place. The image forming element was a piece of black printed label tape (FIG. 16b) made with a Merlin Express Elite label tape machine (Varitronic Systems, Inc., Minn., Minn.) and was positioned with the ink image touching the cube-corner elements. The lamination machine was kept closed at 350° F. (175° C.) for 45 seconds at 40 psi (2.75×10$^5$ Pa) air line pressure. At the end of the processing cycle, the sheeting was removed from the machine. When it returned to room temperature, the polyester carrier was removed to reveal a glittering cube-corner retroreflecting sheet material with a black ink image transferred from the label tape. Examination of the sheeting with retroreflected illumination revealed a retroreflectively dark image on a glittering and retroreflective background.

Example 5

Glittering Image Produced from Woven Fabric

Ordered retroreflective cube-corner sheeting and apparatus described in Examples 1a–1ee were used, with the optional polyester carrier in place. The image forming element was a piece of polyester plain weave fabric 2.2 oz/yd$^2$ (188 g/m$^2$) and was located as illustrated by 104 in FIG. 11. The processing cycle was allowed to continue for 45 seconds at 350° F. (175° C.) with 40 psi (2.75×10$^5$ Pa) line pressure. After the sheeting was cooled to room temperature, the polyester carrier was removed to reveal a cube-corner retroreflective sheeting that contained an overall texture in the pattern of the fabric used and with glittering effect in addition to the overall texture. The glittering textured sheeting thus prepared displayed more intense glittering than sheeting prepared by Example 1 with no texture. The sample was tested for lightness and exhibited a LFY value of 54.33 (mean value of three measurements).

Example 6

Glittering Sheeting Produced by a Continuous Process

Ordered retroreflective cube-corner sheeting as described in Examples 1a–1ee was passed through a continuous nip type lamination station as illustrated in FIG. 12. The apparatus was custom built and comprised a heated stainless steel roll 77, an unheated rubber coated roll 77', a mechanism for controlling and adjusting, by air pressure, the force with which the nip of heated roll 77 and unheated roll 77' meet, and a means of controlling the speed at which the drive roll moves. The continuous lamination apparatus was adjusted to a speed of 1.5 ft/min (30.5 cm/min), 375° F. (175° C.) heated roll, 40 psi (2.75×10$^5$ Pa) nip closure pressure. Sheets of the ordered cube-corner retroreflective sheeting 3 inches by 17 inches (7.5×43 cm) were fed into the moving nip with cube-corner elements touching the unheated rubber coated roll. The sheets were collected after passing through the nip, cooled to room temperature, and the polyester carrier was removed to give a glittering cube-corner retroreflective sheeting. Other processing conditions were used to prepare glittering retroreflective sheeting where the temperature, speed, and nip pressure were changed. Changing these conditions had similar effects on the glittering retroreflective sheetings as observed by changing process conditions in the batchwise process described in Example 1. Similar results were achieved using a continuous roll of sheeting.

Example 7

Glittering Sheeting Produced from an Electroformed Mold

Cube-corner retroreflective sheeting capable of glittering prepared as described in Example 1h was positioned on a backing support and fixed in place with double sided adhesive tape. A silver metal coating was provided over the entire surface by electroless deposition for rendering the glittering cube-corner retroreflecting sheeting conductive for electroplating. The resulting assembly was immersed in a nickel sulfamate bath containing 16 ounces/gallon (120 g/L) of nickel; 0.5 ounces/gallon (3.7 g/L) of nickel bromide; and 4.0 ounces/gallon (30 g/L) of boric acid. The remainder of the plating bath was filled with distilled water. A quantity of S-nickel anode pellets were contained within a titanium basket that was suspended in the plating bath. A woven polypropylene bag was provided that surrounded the titanium basket within the plating bath for trapping particulates. The plating bath was continuously filtered through a 5 micrometer filter. The temperature of the bath was maintained at 90° F. (32° C.) and a pH of 4.0 was maintained in the plating bath solution. A current density of 20 amps per square foot (215 amp/square meter) was applied to the system for 24 hours with the mounted sheeting continuously rotated at 6 rpm to enhance a uniform deposit. Upon removal from the electroforming bath, the cube-corner retroreflective sheeting capable of exhibiting the glittering effect was removed from the electrodeposited metal to give a nickel mold, approximately 0.025 inches (approximately 0.063 cm)

thick, which was the negative image of the original glittering cube-corner retroreflective sheeting. The mold alone displayed the properties of glittering, although it did not exhibit the rainbow hues of which the sheeting was capable, and the mold was retroreflective.

A mixture of 1,6-hexanediol diacrylate, trimethylolpropane triacrylate, and bisphenol A epoxy diacrylate in a ratio of 25:50:25 parts by weight with 1% resin weight of Darocur™ 4265 as photoinitiator (Radcure IRR 1010, Lot N215-0302, UCB Radcure, Smyrna, Ga.) was carefully applied to one edge of the electroformed mold. The bank of resin was slowly rolled across the mold allowing the resin to fill all features of the mold. When a smooth coating of resin was in the mold it was covered by rolling on a vinyl film sheet, 0.010 inches (0.025 cm) thick (American Renolit Corporation, Whippany, N.J. 07981). The resulting construction containing wet resin was cured through the vinyl film by passage through a Fusion Model DRS-120QN system and exposure to a FUSION V lamp operating at high power (235 Watts/cm) at a rate of 25 ft/min. (7.6 m/sec). Removal of the cured sheeting from the mold gave a sheeting that was post cured on the backside of the cube-corner element array by passage under a FUSION H lamp at 25 ft./min. (7.6 m/sec) at high power (235 Watts/cm). The resulting cube-corner sheeting, made from the electroformed mold was retroreflective, glittered, and exhibited a rainbow of colors in the points of light.

Example 8

Glittering Sheeting Produced from an Electroformed Mold with an Ink Image

An image in the shape of "3M" was made with nonaqueous stamp pad ink on the cube-corner side of cube-corner retroreflective sheeting that was prepared as described in Example 1h. When the ink had dried the resulting glittering cube-corner retroreflective sheeting bearing the ink image was mounted, prepared, and electroformed as described in Example 7. Removal of the sheeting from the electroformed mold gave a nickel mold, approximately 0.025 inches (approximately 0.063 cm) thick, which bore a reverse image of the rubber stamp. This mold was used to prepare cube-corner sheeting in accordance with Example 7. After curing and removing the newly formed sheeting from the mold, the sheeting was observed to be retroreflective, capable of exhibiting the glittering effect, capable of exhibiting the rainbow effect, and the sheeting bore the image of "3M" as stamped on the original sheeting from which the mold was made. The image appeared on the sheeting as a nonretroreflective glittering image on a retroreflective background.

Examples 9a–9f

Screen Printed Images

A screen printing hand table (Model 1218 AWT World Trade, Inc., Chicago, Ill.) was fitted with a 110 T (mesh/inch) printing screen bearing the image "Atlanta 1996". Ordered cube-corner retroreflective sheeting as described in Examples 1a–1ee was placed on the printing surface and printed on with the GV-159 transparent permanent blue ink (Naz-Dar Corporation, Chicago Ill. 60622-4292), or with SX 863 transparent green ink (Plast-O-Meric SP, Inc., Sussex, Wis. 53089-0375), or with SX 864 B opaque purple ink (Plast-O-Meric). When the cube-corner elements were facing upwards during printing, the screen printed image was formed on the back side of the cube-corner elements. When the cube-corner elements were facing downwards during printing, the screen printed image was formed on the front, vinyl film surface of the cube-corner sheeting. Sheeting with images printed with GV-159 Permanent Blue was air dried over night before further processing. Sheeting with images printed with SX 863 or with SX 864 B was gelled with a Texair Model 30 screen printing belt oven (American Screen Printing Equipment Company, Chicago, Ill. 60622) adjusted so that the infrared panel would operate at 1100° F. (593° C.), the electrically heated forced air was in the "off" position, and a belt speed to allow residence time of 42–46 seconds, before further processing. After initial drying or gelation, the screen printed cube-corner sheetings were processed under heat and pressure as described in Example 1. Results of the processing are listed below in Table 4.

TABLE 4

Screen Printed Images on Cube-Corner
Retroreflective Sheeting Capable of the Glittering Effect

| Example | Ink | Formula | Image | Sheet Side | Description |
|---------|-----|---------|-------|------------|-------------|
| 9a | GB-159 Permanent Blue | Used as Supplied | Transparent | Vinyl Front | Blue retroreflective through image. Glitter blue from both sides through image. Full glitter outside image area. |
| 9b | GV-159 Permanent Blue | Used as Supplied | Transparent | Cube-Corner Back | No retroreflection in image area. Subdued glitter in image on both back and front. Full glitter outside image. |
| 9c | SX 863 Green | Cyan (8 parts) Yellow (1 part) | Tranparent | Vinyl Front | Green retroreflective through image. Glitter green through image from both sides. Full glitter outside image area. |
| 9d | SX 863 Green | Cyan (8 parts) Yellow (1 part) | Transparent | Cube-Corner Back | Not retroreflective through image. No glitter in image area from either side. Full glitter outside image area from both sides. Extreme clarity through image. |
| 9e | SX 864 B Blue | Cyan (10.6 parts) Magenta (17.7 parts) White (4.3 parts) | Opaque | Vinyl Front | No retroreflection in image area. No glittering from front side in image. Strong white glittering from back side in image. Full glitter outside image area from both sides. |
| 9f | SX 864 B Blue | Cyan (10.6 parts) Magenta (17.7 parts) White (4.3 parts) | Opaque | Cube-Corner Back | No retroreflection in image area. No glittering in image from either side. Full glitter outside image area on both sides. |

Examples 10a–10n

Vapor Coated Sheeting

Ordered nonrandom retroreflective cube-corner sheeting and the apparatus used in Examples 1a–1ee above were used. Retroreflective sheeting was prepared with a vapor deposited layer of material approximately 850 Å thick. The ordered cube-corner retroreflective sheeting was installed in a bell jar type vacuum apparatus having an approximate capacity of 250 liters (Model 900-217-12, Stokes Vacuum Equipment, Equipment Division of Pennsalt Chemical Corporation, Philadelphia, Pa. 19120). After evacuation of the bell jar to $10^{-5}$ Torr or less, the material intended to be vacuum deposited on the sheeting was irradiated with an electron beam (Airco Temescal, Electron Beam Power Supply Model CV-10, Berkeley, Calif.) until deposition on the cube side of the sheeting was complete. The resulting vapor coated, ordered nonrandom cube-corner sheeting was processed by heat and pressure as described in Example 1 to give cube-corner sheeting capable of displaying very strong, extremely brilliant glittering from both sides. The sheeting prepared in this manner appeared to have better lightness than the sheeting that is vapor coated but does not have the cube-corner elements oriented in accordance with the invention. Table 5 below lists representative materials that have been vapor coated onto ordered, nonrandom cube-corner sheeting. After vapor coating, all the sheetings were processed by heat and pressure to make a sheeting capable of glittering. Table 5 also shows a brief characterization of the vapor coated sheetings.

The two steps of this example, vapor coating, then processing by heat and pressure, may be accomplished in reverse order with the same outcome. That is, ordered, nonrandom cube-corner sheeting may first be processed as described in Example 1 to provide sheeting capable of exhibiting the glittering effect. The resulting glittering sheeting may then be subjected to vacuum deposition of materials on the cube-corner side to give cube-corner sheeting that is capable of exhibiting very strong, extremely brilliant glittering from both sides. The column heading "Processing Sequence" in Table 5 refers to whether the cube-corner sheeting was made glittering first and then was vapor coated or was vapor coated and then made glittering. The listing "Glittering, then VC" refers to sheeting that was made glittering in a first operation then vapor coated in a second operation. The listing "VC then glitter and texture" refers to sheeting that was vapor coated in a first operation then made glittering in a second operation. In this case, the vapor coated sheeting was made glittering in the absence of the lower release paper 76 in FIG. 11 and the resulting sheeting has the glittering effect superimposed on an overall pattern or texture from the lower, unheated rubber platen 74.

Examples 10a and 10b were tested for lightness, and these samples exhibited LFY values of 16.7 and 18.9, respectively.

TABLE 5

Glittering Cube-Corner Sheetings Prepared by Vacuum Deposition and Heat and Pressure Processing

| Example | Processing Sequence | Vapor Coated Material | Brightness, $R_A$ (cd/lux/m²) 0° | 90° | Description |
|---|---|---|---|---|---|
| 10a | Glittering, then VC | Aluminum | 384 | 791 | Silver gray with strong glitter and rainbow from front, strong white glitter from back side. |
| 10b | VC then glitter and texture | Aluminum | 240 | | Vapor coated standard sheeting became fully glittering after processing with some rainbow from front. Strong white glitter from back side. |
| 10c | Glittering, then VC | Copper | 303 | 301 | Beautiful red-bronze color with full glitter and rainbow shifted toward shades of red. With retro-illumination sheeting exhibits glittering and retroreflection separately, both in color. |
| 10d | VC then glitter and texture | Copper | 72 | | Vapor coated standard sheeting became fully glittering after processing with rainbow from front side. Back is copper colored with strong glittering; larger and stronger when transmitted from opposite side than when reflected. |
| 10e | Glittering, then VC | ZnS | 355 | 352 | Retroreflective and fully glittering. Rainbow from both sides. |
| 10f | VC then glitter and texture | ZnS | 154 | | Retroreflective with full glittering and rainbow from both sides; larger and stronger when transmitted from opposite side than when reflected from both side. |
| 10g | Glittering, then VC | ZnS/Cryolite | 344 | 506 | Retroreflecting and fully glittering. Rainbow from both sides. |
| 10h | VC then glitter and texture | ZnS/Cryolite | 110 | | Retroreflecting with full glittering and rainbow from both sides; larger and stronger when transmitted from opposite side than reflected from same side. |
| 10i | Glittering, then VC | SiO | 558 | 884 | Retroreflective, transparent sheeting with full glittering and rainbow from both sides. |
| 10j | VC then glitter and texture | SiO | 224 | | Retroreflective with full glittering and rainbow from both sides; stronger when transmitted from opposite side than when reflected from same side. |
| 10k | Glittering, then VC | ZnS/Al | 54 | 59 | Opaque and dull gray with full glittering and some rainbow. Back side is bright silver and glittering. |

TABLE 5-continued

Glittering Cube-Corner Sheetings Prepared by Vacuum Deposition and Heat and Pressure Processing

| Example | Processing Sequence | Vapor Coated Material | Brightness, $R_A$ (cd/lux/m$^2$) 0° | 90° | Description |
|---|---|---|---|---|---|
| 10l | VC then glitter and texture | ZnS/Al | 37 | | Opaque gray with fine grained glitter and small rainbow. Back side is brilliantly silver and glittering. |
| 10m | Glittering, then VC | 20% TiO$_2$ 80% Bi$_2$O$_3$ | 128 | 107 | Dull gray-brown, poorly transparent and retroreflective. Full glittering and rainbow have a metallic appearance because of brown background. |
| 10n | VC then glitter and texture | 20% TiO$_2$ 80% Bi$_2$O$_3$ | 28 | | Brown to golden front face with full glitter and rainbow; stronger when transmitted from other side than reflected from same side. Back side full glitter and rainbow in gold tones. |

Example 11

Preparation of Retroreflective Product Having Seal Film

Glittering cube-corner retroreflective sheetings prepared according to Example 9 were ultrasonically welded to a 0.01 inch (250 micrometers) thick white pigmented, embossed vinyl seal film (Nan Ya, Bachelor, La.). The cube-corner elements of the screen printed glittering sheeting were placed in contact with the embossed side of the seal film, and a 0.002 inch (50 micrometers) thick polyester film was placed on the unembossed side of the seal film. The construction was placed on a patterned anvil attached to the base of a Branson Model 184V ultrasonic welder with the polyester sheeting facing the horn of the welder and the vinyl body layer of the glittering cube-corner sheeting touching the patterned anvil. The ultrasonic welder was operated at 20 Khz, 60 psi (4.2×10$^5$ Pa), 17 fpm (5.2 m/min), with an amplitude equal to 60% of maximum and a 2.865 inch (7.277 cm) horn radius. The anvil comprised three 1 inch (2.5 cm) wide lanes with adjacent triangles having sides approximately 1.5 inches (3.5 cm) in length and bases approximately 2 inches (5 cm) in length, and one 1 inch (2.5 cm) wide lane having diamonds with sides approximately 0.75 inches (2 cm) in length. The ultrasonic welding process gave sealed samples whose seal lines were a clean reproduction of the anvil pattern.

All of the patents and patent applications cited above are wholly incorporated by reference into this patent application.

As illustrated by the above discussion, the invention may take on various modifications and alterations without departing from its total scope and spirit. Accordingly, the invention is not limited to the above-described but is to be controlled by the limitations set forth in the claims and any equivalents thereof.

What is claimed is:

1. A glittering retroreflective sheeting that comprises an array of cube-corner elements that have faces of adjacent cube-corner elements arranged such that a dihedral angle α located between adjacent faces varies to such an extent that the sheeting glitters when exposed to light, the glitter being noticeable from a front side of the sheeting regardless of whether a seal film is secured to the array of cube-corner elements.

2. The retroreflective sheeting of claim 1, wherein the array of cube-corner elements is defined by three sets of intersecting grooves, wherein each groove set includes two or more generally parallel grooves, and at least one groove in at least one of the sets has faces of adjacent cube-corner elements arranged such that a dihedral angle α located between the adjacent faces varies along the groove(s) in the set.

3. The retroreflective sheeting of claim 2, wherein at least one groove in each of the three sets of intersecting grooves has faces of adjacent cube-corner elements arranged such that the dihedral angle α located between the adjacent faces varies along the grooves in all three groove sets.

4. The retroreflective sheeting of claim 1, wherein the cube-corner elements each include a base plane, and the cube-corner elements are arranged such that the base planes do not all reside in the same general plane when the sheeting is laid flat.

5. The retroreflective sheeting of claim 1, wherein the cube-corner elements are randomly-tilted across at least a portion of the array.

6. The retroreflective sheeting of claim 3, wherein the cube-corner elements are about 60 to 200 micrometers high and exhibit a variation in height between adjacent apexes of 1 to 40 micrometers on average.

7. The retroreflective sheeting of claim 1, wherein the glitter may be seen from front and back sides of the sheeting when light strikes either the front or the back of the array.

8. The retroreflective sheeting of claim 1, wherein the glitter may be seen continuously as the sheeting is rotated 360 degrees.

9. The retroreflective sheeting of claim 1, wherein the sheeting glitters under all possible illumination and viewing angles.

10. The retroreflective sheeting of claim 1, wherein the glitter provides the sheeting with a luminance factor Y value of 38 or greater when measured in accordance with ASTM E 1349-90.

11. The retroreflective sheeting of claim 10, wherein the glitter provides the sheeting with a luminance factor Y value of 55 or greater when measured in accordance with ASTM E 1349-90.

12. The retroreflective sheeting of claim 1, wherein the array of cube-corner elements are coated with a layer of metal, and wherein the sheeting demonstrates a luminance factor Y of 10 or greater.

13. The retroreflective sheeting of claim 1, wherein the array of cube-corner elements are coated with a layer of metal, and wherein the sheeting demonstrates a luminance factor Y of 25 or greater.

14. The retroreflective sheeting of claim 1, wherein the cube-corner elements have base edges that do not lie in the same common plane when the sheeting is laid flat.

15. The retroreflective sheeting of claim 2, wherein angle α varies from 0 degrees to 180 degrees.

16. The retroreflective sheeting of claim 15, wherein angle α ranges from 35 to 115 degrees on average.

17. The retroreflective sheeting of claim 1, wherein some cube-corner elements are piled up on each other.

18. The retroreflective sheeting of claim 1, which contains a glittering image on a non-glittering background.

19. The retroreflective sheeting of claim 1, which contains a non-glittering image on a glittering background.

20. The retroreflective sheeting of claim 1, which contains a glittering image on a glittering background.

21. The retroreflective sheeting of claim 1, having an image printed with a transparent ink on a front surface of the sheeting, the glitter being visible through the transparent image.

22. The retroreflective sheeting of claim 1, wherein the points of light that comprise the glitter exhibit various colors of the visible spectrum.

23. The retroreflective sheeting of claim 1, wherein the glitter produces at least about 10 points of light per square centimeter.

24. The retroreflective sheeting of claim 1, wherein the glitter produces at least about 50 points of light per square centimeter.

25. The retroreflective sheeting of claim 24 comprising less than about 250 points of light per square centimeter.

26. A retroreflective product that includes the retroreflective sheeting of claim 1 and further comprises a seal film secured to a back side of the array of cube-corner elements.

27. An article of clothing that comprises the retroreflective product of claim 23 secured to an outer surface thereof.

28. A retroreflective article that includes the retroreflective sheeting of claim 1 placed in a tubular configuration.

29. The retroreflective article of claim 28 comprising a fitting at an end thereof, which fitting allows it to be secured to a light source.

30. A glittering article that is capable of retroreflecting light, which article comprises:

(a) a base surface; and (b) a structured surface opposite the base surface, the structured surface comprising an array of cube-corner elements, which array is defined by three sets of intersecting grooves, wherein each groove set includes two or more generally parallel grooves, and at least one groove in at least one of the sets has faces of adjacent cube-corner elements arranged such that a dihedral angle located between the adjacent faces varies along the groove(s) in the set, the variance of the dihedral angle not being associated with the securement of a seal film to the structured surface.

31. A glittering retroreflective sheeting that comprises:

a structured surface that includes a multiplicity of discreet cube-corner elements, the cube-corner elements each including a base surface and three faces, the cube-corner elements being arranged such that the base surfaces do not reside in the same plane when the sheeting is laid flat and such that the retroreflective sheeting glitters when light is incident thereon.

32. A glittering article that is capable of retroreflecting light, which article comprises:

(a) a base surface; and (b) a structured surface opposite the base surface, wherein the structured surface comprises an array of cube-corner elements that are randomly tilted to such an extent that the retroreflective article glitters when light is incident thereon, the random tilting of the cube-corner elements not being associated with the securement of a seal film to the structured surface.

33. The glittering article of claim 32, wherein the cube-corner elements meet, but are not necessarily connected to, adjacent cube-corner elements.

34. The glittering retroreflective sheeting of claim 1, wherein the cube-corner elements are defined by generally intersecting grooves, and wherein at least one groove has the faces of the adjacent cube-corner elements arranged such that the dihedral angle α located between adjacent faces varies along the groove(s).

* * * * *